US010255889B2

(12) United States Patent
Du et al.

(10) Patent No.: US 10,255,889 B2
(45) Date of Patent: Apr. 9, 2019

(54) LIGHT FIELD DISPLAY CONTROL METHODS AND APPARATUSES, LIGHT FIELD DISPLAY DEVICES

(71) Applicant: BEIJING ZHIGU RUI TUO TECH CO., LTD., Beijing (CN)

(72) Inventors: Lin Du, Beijing (CN); Liang Zhou, Beijing (CN)

(73) Assignee: Beijing Zhigu Rui Tuo Tech Co., Ltd., Beijing (CN)

( * ) Notice: Subject to any disclaimer, the term of this patent is extended or adjusted under 35 U.S.C. 154(b) by 94 days.

(21) Appl. No.: 15/539,870

(22) PCT Filed: Nov. 20, 2015

(86) PCT No.: PCT/CN2015/095106
§ 371 (c)(1),
(2) Date: Jun. 26, 2017

(87) PCT Pub. No.: WO2016/107329
PCT Pub. Date: Jul. 7, 2016

(65) Prior Publication Data
US 2017/0372683 A1    Dec. 28, 2017

(30) Foreign Application Priority Data

Dec. 29, 2014   (CN) .......................... 2014 1 0837411

(51) Int. Cl.
| G09G 5/10 | (2006.01) |
|---|---|
| G09G 5/38 | (2006.01) |
| G09G 5/391 | (2006.01) |
| H04N 13/307 | (2018.01) |

(52) U.S. Cl.
CPC ............... *G09G 5/38* (2013.01); *G09G 5/10* (2013.01); *G09G 5/391* (2013.01); *H04N 13/307* (2018.05); *G09G 2340/04* (2013.01)

(58) Field of Classification Search
None
See application file for complete search history.

(56) References Cited

U.S. PATENT DOCUMENTS

| 2007/0076099 A1 | 4/2007 | Eshed et al. |
|---|---|---|
| 2008/0151089 A1 | 6/2008 | Street et al. |

(Continued)

FOREIGN PATENT DOCUMENTS

| CN | 103813152 A | 5/2014 |
|---|---|---|
| CN | 103974115 A | 8/2014 |

(Continued)

OTHER PUBLICATIONS

International Search Report and Written Opinion for Application No. PCT/CN2015/095106, dated Mar. 4, 2016, 10 pages.

(Continued)

*Primary Examiner* — Frank S Chen
(74) *Attorney, Agent, or Firm* — Sheppard Mullin Richter & Hampton LLP

(57) ABSTRACT

Embodiments of the present application disclose various light field display control methods and apparatuses and various light field display devices, wherein a light field display control method disclosed comprises: sampling a source image according to interest level distribution information of the source image; determining a light field image corresponding to the sampled source image; adjusting display pixel density distribution of a display of a light field display device at least according to the interest level distribution information; and displaying the light field image via the adjusted light field display device. The technical solution provided in the embodiments of the present application can make full use of pixels of the display of the light field display device to present differential spatial resolution of different regions of a light field display image.

33 Claims, 14 Drawing Sheets

(56) References Cited

U.S. PATENT DOCUMENTS

| | | | |
|---|---|---|---|
| 2010/0118125 A1* | 5/2010 | Park | G06K 9/32 348/46 |
| 2013/0285885 A1 | 10/2013 | Nowatzyk et al. | |
| 2014/0125957 A1 | 5/2014 | Lee et al. | |

FOREIGN PATENT DOCUMENTS

| | | |
|---|---|---|
| CN | 104157660 A | 11/2014 |
| CN | 104159025 A | 11/2014 |
| CN | 104243823 A | 12/2014 |
| CN | 104246578 A | 12/2014 |
| CN | 104519347 A | 4/2015 |
| WO | 2007/119666 A1 | 10/2007 |

OTHER PUBLICATIONS

Hirsch et al., "A Compressive Light Field Projection System," ACM Transactions on Graphics, 2014, 12 pages.

Huang et al., "Eyeglasses-free Display: Towards Correcting Visual Aberrations with Computational Light Field Displays," Jul. 2014, ACM Transactions on Graphics, vol. 33, No. 4, Article 59, 12 pages.

Ko et al., "A hemispherical electronic eye camera based on compressible silicon optoelectronics," Nature, Aug. 2008, vol. 454, p. 748-753.

Lanman et al., "Near-Eye Light Field Displays," ACM Transactions on Graphics, 2013, 10 pages.

Lightfield Forum, "Adobe LightField Camera Protypes," downloaded Jun. 1, 2017, 8 pages, from http://lightfield-forum.com/lightfield-camera-prototypes/adobe-lightfield-camera-protypes/.

Maimone, A. "Focus 3D: Compressive Accommodation Display," ACM Transactions on Graphics, 2013, 153:2, 12 pages.

Ng et al., "Flexible image sensor array with bulk heterojunction organic photodiode," Applied Physics Letters, 2008, vol. 92, p. 213303.

Yu et al., "Direct bending of a polymer film by light," Nature, Sep. 2003, vol. 425, p. 145.

\* cited by examiner

LIGHT FIELD DISPLAY CONTROL METHODS AND APPARATUSES, LIGHT FIELD DISPLAY DEVICES

CROSS-REFERENCE TO RELATED APPLICATIONS

This application is a National Phase Application of International Application No. PCT/CN2015/095106, filed on Nov. 20, 2015, which claims priority to and benefit of Chinese Patent Application No. 201410837411.6, filed on Dec. 29, 2014, and entitled "Light Field Display Control Methods and Apparatus, Light Field Display Devices", each of which is herein incorporated by reference in its entirety.

TECHNICAL FIELD

The present application generally relates to the field of light field display technologies, and in particular, to various light field display control methods and apparatus and various light field display devices.

BACKGROUND

The light field display technology was developed in the early 20th century, and two representative implementations are: an implementation based on Lenslet array developed by Lippmann in 1908 and another based on Parallax Barriers developed by Ives in 1903. In recent years, with diversified demands of consumer electronic products for display devices, the light field display technology has been applied to different scenarios and devices, for example, 3D displays, wearable devices, vision-correction light field displays and the like. Currently, gradual matching of computing capability, display resolution and light field display technologies of electronic devices with hardware resource requirements provides good support for popularization and application of the light field display technologies.

The light field display technologies can achieve relatively flexible display effects through hardware structures similar to traditional light field display technologies, for example, light field 3D display, light field projection display, light field near-to-eye display on wearable devices, vision correction of light field display, and so on, however, achieving the flexible display characteristic is at the cost of sacrificing display resolution, that is to say, based on the same display pixel condition, spatial resolution of an image displayed with a light field display technology is lower than that of the traditional image, and an issue of how to improve spatial resolution of a light field display image becomes a research hotspot in the industry.

SUMMARY

A brief summary about the present application is given hereinafter, so as to provide a basic understanding about certain aspects of the present application. It should be understood that the summary is not an exhaustive summary of the present application. It is neither intended to define critical or important parts of the present application, nor intended to limit the scope of the present application. Its purpose is merely giving some concepts in a simplified form, to be taken as the preamble of the following detailed description.

The present application provides various light field display control methods and apparatuses and various light field display devices.

In one aspect, embodiments of the present application provide a light field display control method, comprising:

sampling a source image according to interest level distribution information of the source image;

determining a light field image corresponding to the sampled source image;

adjusting display pixel density distribution of a display of a light field display device at least according to the interest level distribution information; and displaying the light field image via the adjusted light field display device.

In another aspect, the embodiments of the present application further provide a light field display control apparatus, comprising:

a source image sampling module, configured to sample a source image according to interest level distribution information of the source image;

a light field image determination module, configured to determine a light field image corresponding to the sampled source image;

a display pixel density distribution adjusting module, configured to adjust display pixel density distribution of a display of a light field display device at least according to the interest level distribution information; and a display control module, configured to display the light field image via the adjusted light field display device.

In a further aspect, the embodiments of the present application provide a light field display device, comprising:

a display;

a sub-lens array; and the light field display control apparatus as described above, the light field display control apparatus being in a communication connection with the display.

The technical solution provided in the embodiments of the present application can make full use of pixels of the display of the light field display device to present differential spatial resolution of different regions of a light field image, thus meeting users' differential display demands for local definition of an image, improving display efficiency and meeting the users' diversified actual application demands. In addition, the technical solution provided in the embodiments of the present application samples the source image at least according to interest level distribution information and adjusts display pixel density distribution of the display, to try to reduce deformation such as a display scale of a local region of an actual display image possibly caused by the differential pixel distribution of the source image and the display, thus improving display effects and enhancing user experience.

These and other advantages of the present application will be more evident through the following detailed description about optional embodiments of the present application with reference to the accompanying drawings.

BRIEF DESCRIPTION OF THE DRAWINGS

The present application can be better understood with reference to the description given below in combination with the accompanying drawings, in which the same or similar reference signs are used in all the drawings to indicate the same or similar components. The drawings together with the following detailed description are comprised in the specification and form a part of the specification, and are configured to further exemplify alternative embodiments of the present application and explain the principle and advantages of the present application. In the drawings.

Figure 1A:
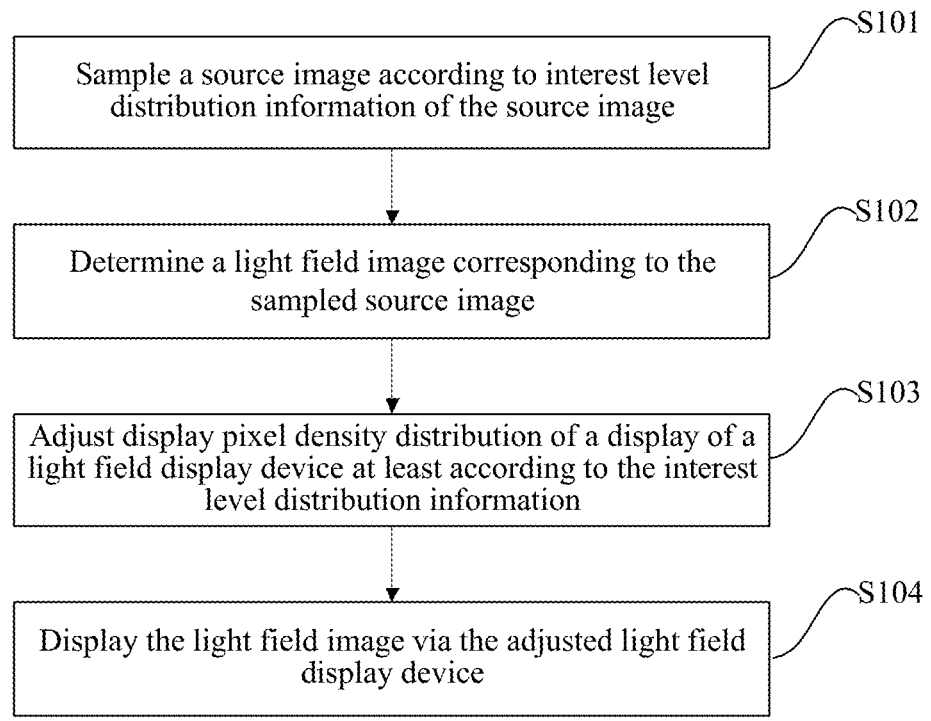
FIG. 1a is a flowchart of a light field display control method according to one embodiment of the present application.

Those skilled in the art should understand that, elements in the drawings are merely illustrated for the sake of simplicity and clarity, and may not be drawn to scale. For example, sizes of certain elements in the drawings may be amplified relative to other elements, so as to help to improve the understanding about the embodiments of the present application.

DETAILED DESCRIPTION

Exemplary embodiments of the present application are described below in detail with reference to the accompanying drawings. For the sake of clarity and simplicity, not all the features of actual implementations are described in the specification. However, it should be understood that, many decisions specific to implementations must be made during development of any such actual embodiment, so as to achieve specific goals of developers, for example, restrictions relevant to systems and services are met, and the restrictions may vary with different implementations. In addition, it should also be understood that, development work may be very complicated and time-consuming, and those skilled in the art will benefit from the disclosure in actual implementations.

Herein, it should also be noted that, in order to avoid blurring the present application due to unnecessary details, not all apparatus structures and/or processing steps related to solutions according to the present application are described in detail in the accompanying drawings and the specification. Representation and description about members and processing known to those of ordinary skill in the art may be omitted.

Specific implementations of the present application are described in detail hereinafter with reference to the accompanying drawings and embodiments (in which the same elements are denoted by the same reference numerals). The following embodiments are intended to describe the present application, but not to limit the scope of the present application.

It should be understood by those skilled in the art that the terms such as "first" and "second" in the present application are merely intended to distinguish different steps, devices or modules, etc., which neither represent any particular technical meaning nor indicate a necessary logical sequence between them.

The inventor of the present application has found that, generally, when a light field display device performs light field display, display pixel density distribution of a display of the light field display device is fixed, and based on this, display capability of the display has certain limitations in an aspect of meeting users' diversified application demands. In some scenes, different regions in a certain frame image may be of different meanings and/or significance for users, that is, a user may demonstrate different levels of interest in different regions of a displayed image. For example, in a character light field display scene, a user is more interested in human faces in the image than in scenery of the image; and so on. As the light field display technology will sacrifice spatial resolution of an image displayed to some extent while displaying the image, the spatial resolution of the displayed image is lower when light field display is performed based on the light field display technology. If it is intended to improve light field display quality of a region of interest (ROI), a high-resolution display can be used to improve overall definition of the displayed image, which will consume great power, while, if the user has different requirements for display definition of different regions of an image, for example, the user may only focus on definition of a local part (such as a human face, a license plate number or another ROI) in an image, but has lower requirements for definition of other parts (such as background and road) in the image, in such cases, if the image is displayed simply by using a high-resolution display, it may result in a lower actual utilization rate of display pixels and increase of power consumption.

In light of this, the embodiments of the present application provide a light field display control method, which can make full use of pixels of the display of the light field display device to present differential spatial resolution of different regions of a light field display image, thus meeting the users' diversified actual application demands. The technical solution is described below with reference to the accompanying drawings.

FIG. 1a is a flowchart of a light field display control method according to one embodiment of the present application. An execution body of the light field display control method according to the embodiment of the present application may be a certain light field display control apparatus, and the light field display control apparatus may perform image display control by executing the light field display control method in applications such as image presentation and video playback. Device manifestations of the light field display control apparatus are not limited, for example, the light field display control apparatus may be a certain separate component, and the component cooperates and communicates with the light field display device comprising a display; or the light field display control apparatus may be integrated, as a certain functional module, into a display device comprising a display, and the light field display device may be, but is not limited to, TVs, computers, cameras, mobile phones, video recorders and the like which have light field display capability and include a display.

Specifically, as shown in FIG. 1a, a light field display method provided in the embodiment of the present application comprises:

S101: Sample a source image according to interest level distribution information of the source image.

The interest level distribution information is configured to represent distribution of levels at which a user or device is interested in different local regions of the source image. If the levels at which the user or device is interested in different local regions of the source image are not exactly the same, interest levels of different image regions corresponding to the interest level distribution information are not the same either, that is, the interest level distribution information is unevenly distributed.

The source image is sampled according to the interest level distribution information, to cause sampling densities of different image regions of the source image to match interest levels corresponding to the corresponding image regions. For example, in a process of sampling the source image, the greater the sampling density of the image region with a higher interest level is, the more the image pixels obtained through sampling are; the smaller the sampling density of the image region with a lower interest level is, the fewer the image pixels obtained through sampling are.

S102: Determine a light field image corresponding to the sampled source image.

Figure 2:
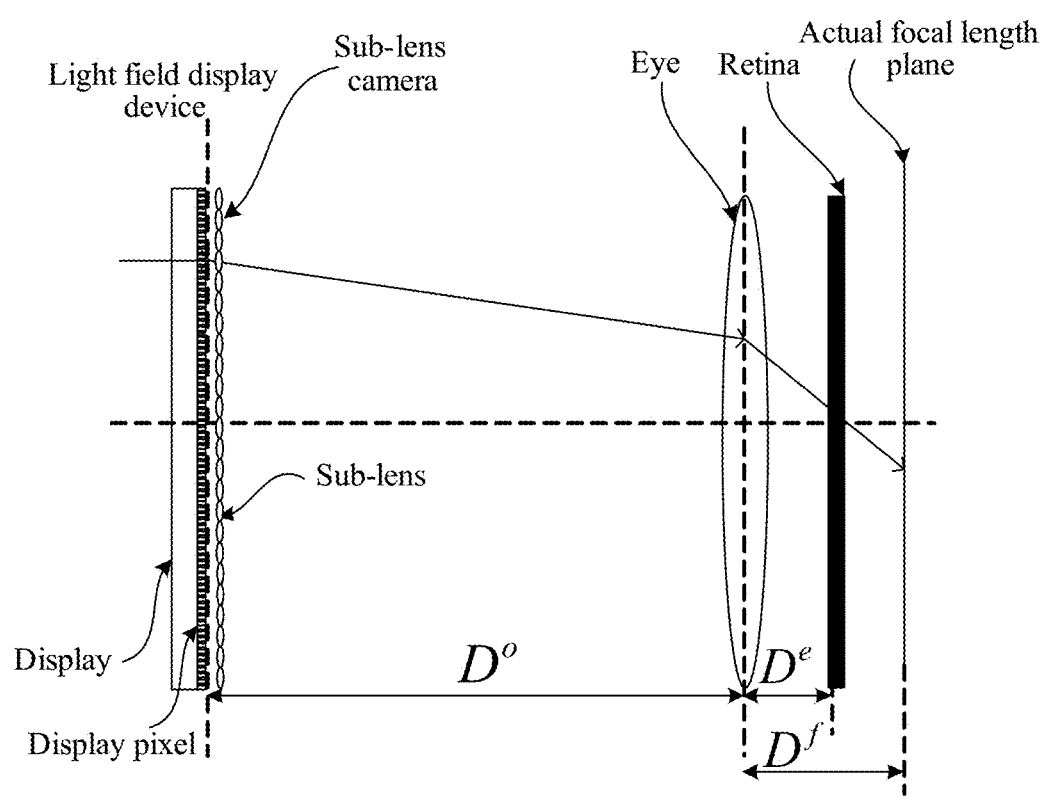
FIG. 2 is an example of an optical light path of light field display according to one embodiment of the present application.

Different from the traditional display device, the light field display device may be provided with a sub-lens array near the display, as shown in FIG. 2, the sub-lens array may also be called microlens array, which comprises multiple array-distributed sub-lenses (or called microlenses), light rays from the display change their propagation direction via at least one sub-lens in the sub-lens array, and the light rays, after the propagation direction is changed, are converged via a user's eye (similar to a lens) to be imaged on the user's retina. The display comprises multiple display regions, one display region comprises multiple display pixels and one display region corresponds to one sub-lens, that is to say, in the light field display device, a one-to-many corresponding relationship is presented between the sub-lens array and the display pixels of the display, and information of different viewing angles of the same local part of an image to be displayed can be displayed through multiple display pixels of the display, which can thus achieve rich display characteristics of a light field image. In actual applications, the light field image can be obtained by performing light field collection on or pre-processing the sampled source image according to expected presentation effects, to cause imaging of the light field image to be an image of which an aberration is eliminated, when acquired at a human eye's retina via the display and the sub-lens array according to the principle of reversibility of optical path.

S103: Adjust display pixel density distribution of a display of a light field display device at least according to the interest level distribution information.

In an embodiment of the present application, the display of the light field display device is a display with adjustable pixel density, the display may comprise, but not limited to, a flexible display, and the flexible display comprises a flexible substrate and multiple display pixels formed on the flexible substrate, wherein the flexible substrate, under certain conditions, may adjust display pixel density distribution thereof through expansion and contraction, bending or other changes. One of the display pixels may comprise, but is not limited to, at least one light-emitting unit; the light-emitting unit may comprise, but is not limited to, a Light Emitting Diode (LED) light-emitting unit and an Organic Light Emitting Diode (OLED) light-emitting unit; emitting color of one of the light-emitting units may be determined according to actual needs, which may comprise, but is not limited to, one or more light-emitting sub-units, and the light-emitting sub-units may comprise LED light-emitting sub-units and OLED light-emitting sub-units; and the multiple light-emitting sub-units may comprise, but are not limited to, LED light-emitting sub-units and OLED light-emitting sub-units in different colors such as red (R), green (G) and blue (B).

While rich and flexible display effects of the light field image are achieved, spatial resolution of the displayed light field image is reduced relative to the traditional display technology. For example, suppose that the sub-lens array comprises M×N sub-lenses, resolution of the display is A×B, and A×B pixels of the display are divided into M×N display regions (A is greater than M, B is greater than N). In a situation where a sub-lens corresponds to a display region of the display, light rays emitted by display pixels of a display region are converged on a user's eye after their propagation direction is changed via a sub-lens corresponding to the display region. Each display region comprises X×Y pixels, spatial resolution of the displayed light field image corresponds to distribution of sub-lenses of the sub-lens array, which is M×N, and the spatial resolution is lower than the resolution of the display which is A×B. Similarly, in a situation where a sub-lens corresponds to multiple display regions of the display, spatial resolution of the light field image displayed by the display is usually between M×N and A×B, and is also lower than the resolution of the display which is A×B. If light rays emitted by display pixels of different display regions are converged on the user's eye after the propagation direction is changed via the corresponding sub-lenses, a light field image relative to the user can be formed, and according to richness of light field image information, the light field image finally presented to the user may be focused images and vision correction images with different depths for the user, but image definition of the light field image displayed is usually lower than that of an image displayed with the traditional display technology.

In combination with the characteristic that the display pixel density distribution of the display is adjustable, the embodiment of the present application may adjust display pixel density distribution of the display of the light field display device at least according to the interest level distribution information, equivalent to re-adjusting display pixel attribution of the display according to different interest levels corresponding to display content, to cause pixel density distribution of the adjusted display to match differential distribution of spatial resolution (or definition) of the light field image and deformation such as a display scale to be reduced as much as possible. Specifically, the image source before sampling is usually a clearer image, and resolution of different image regions is the same; after the source image is sampled according to the interest level distribution information, resolution of the sampled source image presents differential distribution due to different interest levels, and if a drive mode and any other factors that may affect image display are not taken into account, deformation of a display scale such as enlargement may exist in an image region with greater resolution; in a situation where the light field image is displayed based on a light field display device, a certain corresponding relationship exists between a light field image to be displayed and display pixels of a display, and as the light field image is determined by the source image sampled according to the interest level distribution information, resolution of the light field image also presents uneven distribution to some extent; in order to reduce deformation such as a display scale of a local region possibly caused by differential sampling on the source image in a process of displaying the light field image via an optical path of the light field display device, display pixel density of the display can be adjusted according to the interest level distribution information, to cause display pixel distribution of the adjusted display to correspond to image pixel distribution of the light field image in a process of performing light field display on the light field image via the light field display device comprising the adjusted display, and when a human eye sees the light field image displayed by the display via the sub-lens array of the light filed display device, the light field image is an image of which the local deformation such as phase difference and display scale is eliminated.

S104: Display the light field image via the adjusted light field display device.

When the human eye directly sees the light field image displayed by the display without the sub-lens array, the light field image is generally a blurred image, while when the human eye sees the light field image displayed by the display via the sub-lens array of the light field display device, the light field image is an image of which the deformation such as phase difference and display scale is eliminated, resolution of some regions of the image is higher and clearer, while resolution of some regions is lower and relatively vague, that is, overall spatial resolution of the image presents differential distribution, and the differential distribution of the spatial resolution of the image corresponds to interest level distribution information of the source image.

Thus, the technical solution provided in the embodiments of the present application can make full use of pixels of the display of the light field display device to present differential spatial resolution of different regions of a light field image, thus meeting users' differential display demands for local definition of an image, improving display efficiency and meeting the users' diversified actual application demands. In addition, the technical solution provided in the embodiments of the present application samples the source image at least according to interest level distribution information and adjusts display pixel density distribution of the display, to reduce deformation such as a display scale of a local region of an actual display image possibly caused by the source image and differential distribution of pixels of the display, thus improving display effects and enhancing user experience.

In the technical solution provided in the embodiments of the present application, optionally, the light field display control method further comprises: acquiring the interest level distribution information of the source image. The manner of acquiring the interest level distribution information can be determined according to actual needs and is very flexible.

In one optional implementation, the acquiring the interest level distribution information may comprise: acquiring interest level indication information of the source image; and determining the interest level distribution information according to the interest level indication information. The interest level indication information can be acquired from a user or device, as a basis for determining the interest level distribution information of the source image. Content and manifestations of the interest level indication information can be determined according to actual needs, the interest levels are configured to represent relative values of levels at which the user or device is interested in different image regions of the source image, an interest level of an ROI of the source image is usually higher, an interest level of a non-ROI is usually lower, and the ROI may comprise, but is not limited to, one or more of the following: at least one region of the source image selected by a user (i.e., a user selection region of the source image), at least one region of the source image gazed by the user (i.e., a user gaze region of the source image), and an ROI obtained by automatically detecting the source image by an image display control apparatus. The solution determines interest level distribution information of the source image according to the interest level indication information, to cause determination of the interest level distribution information to be more consistent with actual user demands, which can better meet users' personalized application demands.

In another optional implementation, the acquiring the interest level distribution information may comprise: performing image analysis on the source image; and determining the interest level distribution information according to a result of the image analysis. For example, face recognition is performed on the source image, higher interest levels are assigned to regions which correspond to a human face in the source image according to a recognition result, while lower interest levels are assigned to other regions of the source image, and so on. This solution can automatically determine the interest level distribution information according to a result of the image analysis on the source image, to cause determination of the interest level distribution information to be more intelligent, thereby improving efficiency and universality of the determination of the interest level distribution information.

Figure 3A:
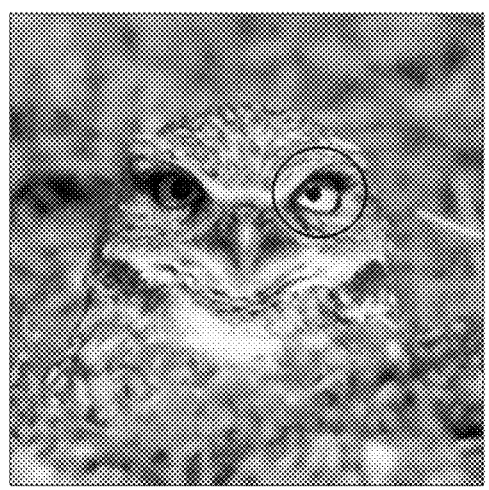
FIG. 3a is an example of a source image according to one embodiment of the present application.
Figure 3B:
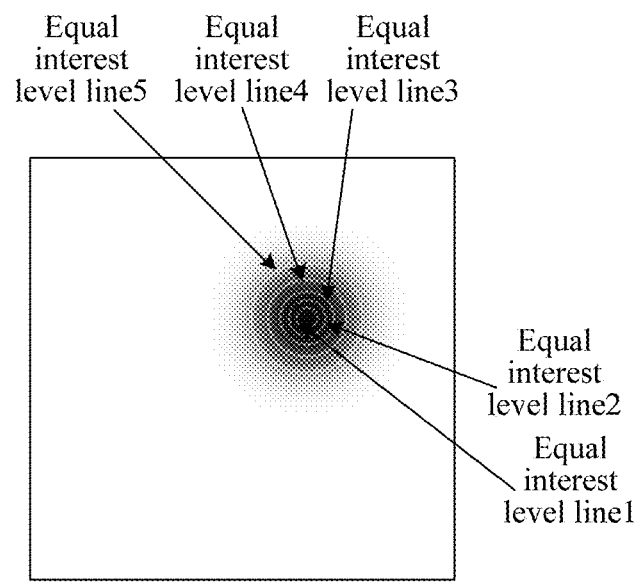
FIG. 3b is an example of a heat map of interest level distribution information according to one embodiment of the present application.
Figure 3C:
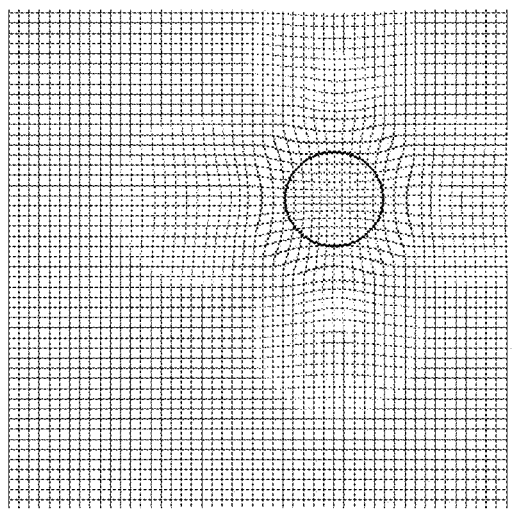
FIG. 3c is an example of target sample density distribution information according to one embodiment of the present application.
Figure 3D:
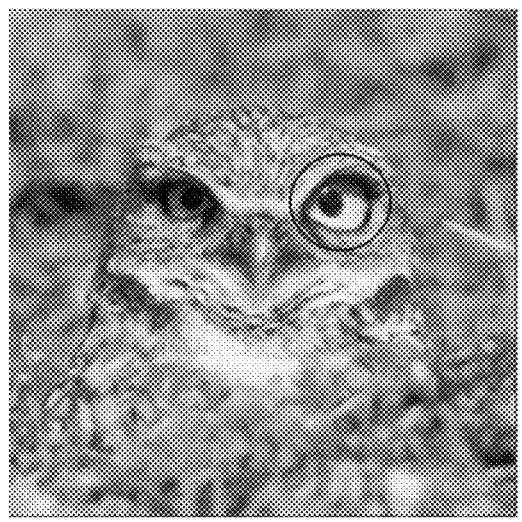
FIG. 3d is an example of the sampled source image according to one embodiment of the present application.

After the interest level distribution information is acquired, the source image can be sampled according to the interest level distribution information. Optionally, the sampling a source image according to interest level distribution information comprises: determining target sampling density distribution information according to the interest level distribution information, at least two target sampling densities in the target sampling density distribution information, which respectively correspond to different interest levels, are different; and sampling the source image according to the target sampling density distribution information, pixel or resolution distribution of the sampled source image being the same as or as similar to the target sampling density distribution information as possible. This solution can achieve differential sampling of the source image, to cause differential distribution of pixels or resolution of the sampled source image to match differential interest level distribution of the source image. For example, the source image is generally a clear image with higher resolution; as shown in FIG. 3a, the parts marked with lines in FIG. 3a might as well serve as image regions with higher interest levels. The interest level distribution information of the source image may be expressed through, but not limited to, a heat map, as shown in FIG. 3b, positions in FIG. 3b correspond to at least one pixel point of the source image, thus, interest levels corresponding to different image regions of the source image may be the same or may not be exactly the same, and interest levels of pixel points corresponding to points of regions within an equal interest level line are the same. Target sampling density distribution information of the source image is determined according to the interest level distribution information, and the target sampling density distribution information also presents uneven distribution correspondingly, as shown in FIG. 3c. The target sampling density distribution information is usually used to represent a user or device's relative expectation for resolution of different regions of the source image, and for a region with higher expectation for resolution of the source image, sampling density corresponding to the region is greater; for a region with lower expectation for resolution of the source image, sampling density corresponding to the region is smaller. Optionally, in the target sampling density distribution information, an average target sampling density corresponding to interest levels higher than a first threshold is higher than an average target sampling density corresponding to interest levels lower than a second threshold, the first threshold being greater than or equal to the second threshold. That is to say, a certain corresponding relationship exists between interest levels in the interest level distribution information and target sampling densities in the target sampling density distribution information, the corresponding relationship can be determined according to actual needs, and the implementation is very flexible. For example, different target sampling densities can be determined for different interest levels; or, for another example, one or more interest level thresholds can be determined, for example, the first threshold and/or the second threshold, and corresponding average target sampling densities are determined for interest levels higher or lower than a relative threshold, thus improving flexibility of actual sampling. The source image is sampled according to the target sampling density distribution information, equivalent to achieving differential sampling for different regions of the source image, sampling densities of image regions corresponding to higher interest levels may be higher than those of image regions with lower interest levels, to cause resolution of the sampled source image to present differential distribution, and if a drive mode and any other factors that may affect image display are not taken into account, deformation of a display scale such as enlargement may exist in an image region with greater resolution, as shown in FIG. 3d.

After the sampled source image is acquired, a light field image corresponding to the sampled source image can be determined. Optionally, the determining a light field image corresponding to the sampled source image comprises: pre-processing the sampled source image according to vision information of a user to obtain the light field image. The solution can pre-process content of the sampled source image with respect to vision information of a user, and convert the sampled source image into a light field image on which rough content recovery is performed via the light field display device according to the principle of reversibility of optical path, and the displayed light field image is a clear image in focus relative to the user. This solution not only can be applied to pre-processing scenes of a light field image corresponding to an image viewed in terms of a user with normal vision, but also can be applied to pre-processing of a light field image corresponding to an image viewed in terms of a user whose vision needs to be corrected (such as nearsightedness and farsightedness), and the implementation is flexible.

It might as well pre-process the sampled source image to obtain the light field image by taking the optical light path shown in FIG. 2 as example. Optionally, the sampled source image can be pre-processed in a manner of constructing a transform matrix according to vision information of a user to obtain a light field image having a certain aberration, while the aberration, via light path change of the sub-lens array, can cancel and form a re-focusing image relative to the vision information, and a simplified physical model is as follows:

$$i = P \times l^d \quad (1)$$

In the above formula, i indicates the sampled source image, $l^d$ indicates a pre-processed image to be calculated (i.e., the light field image), and P indicates a transform matrix determined according to the vision information of the user, wherein:

$$P = \begin{pmatrix} -\dfrac{D^o}{D^e} & D^o \Delta \\ 0 & 1 \end{pmatrix} \quad (2)$$

In the above formula:

$$\Delta = \dfrac{1}{D^e} - \dfrac{1}{f} + \dfrac{1}{D^o} \quad (3)$$

wherein $D^o$ indicates a distance between an eye pupil of the user and a display screen of the light field display device, $D^e$ indicates a distance between the eye pupil of the user and a retina, and f indicates a lens focal length of an eyeball. If a certain user is a user with normal vision, when the user sees an object clearly with a naked eye, an actual focal length plane of the eye is usually a retina; if the vision of the user needs to be corrected, such as a short-sighted user or a far-sighted user, when the user sees an object with a naked eye, an actual focal length plane of imaging of the object in the eye of the user is usually not on the retina, for example, a certain plane before or after the retina is an actual focal length plane of the user. A distance between the pupil of the user and the actual focal length plane is indicated as $D^f$:

$$D^f = \frac{fD^o}{D^o - f} \quad (4)$$

Figure 3E:
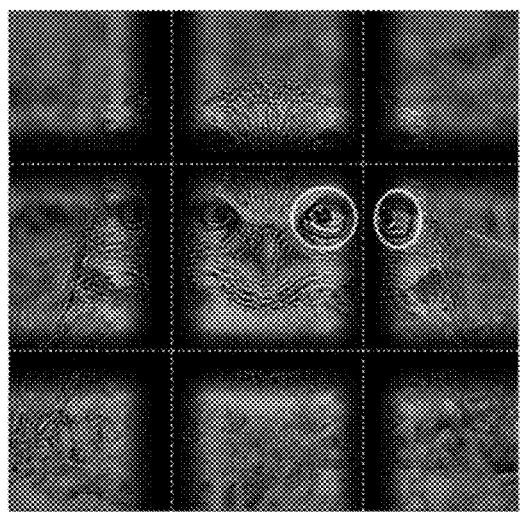
FIG. 3e is an example of a light field image according to one embodiment of the present application.

A pre-processed light field image related to the sampled source image can be acquired according to the above formulas, that is, $l^d$. The light field display control apparatus sends the light field image to the display of the light field display device for display, if influences on image display effects possibly caused by factors such as adjustment of display pixels of the display are not taken into account, the light field image seen by the user via the display is blurred, for example, if the light field image is divided into multiple sub-images (i.e., light field sub-images), each light field sub-image corresponds to at least one sub-lens of the sub-lens array, and in this way, local content repetition may exist between two adjacent light field sub-images, as FIG. 3e, which is an effect of superimposition of light field information. Light rays displayed by the display can change their propagation direction via the sub-lens array disposed near the display, the light rays whose propagation direction is changed via sub-lenses in the sub-lens array are re-imaged, the re-formed image cancels an aberration introduced in a pre-processing process, and is in focus in terms of a user having the vision information, that is to say, the sampled source image, after being pre-processed and displayed via the sub-lens array, forms a re-focused image relative to the source image, and when the user having the vision information views the image via the sub-lens image, the viewed image can be clearly imaged on the retina of the user; therefore, a user with normal vision or a user whose vision needs to be corrected can see a clear in-focus image via the sub-lens array with a naked eye (i.e., it is unnecessary for the user whose vision needs to be corrected to wear a vision correction device). This solution pre-processes content of the source image according to vision information of a user, to cause a light field image obtained through pre-processing to better match the vision information of the user, thereby improving viewing effects of the user. In the embodiment of the present application, the vision information may comprise, but is not limited to $D^o$, $D^e$, f, $D^f$ and so on; the vision information may be acquired once, and may also be acquired dynamically in the course of image display, to achieve tracking the user's eye state to dynamically adjust a processing result, to cause light field images displayed when the user changes an eye viewing position to be a certain in-focus image relative to the current viewing position of the user as much as possible, thereby improving viewing effects and user experience.

In the technical solution provided in the embodiments of the present application, optionally, the adjusting display pixel density distribution of a display at least according to the interest level distribution information comprises: determining target pixel density distribution information of the display according to the vision information of the user and the interest level distribution information, at least two target pixel densities in the target pixel density distribution information, which respectively correspond to different interest levels, are different; and adjusting the display pixel density distribution of the display according to the target pixel density distribution information. As the source image performs differential sampling of different image regions according to the interest level distribution information and the light field image is a light field image related to the sampled source image determined according to the vision information of the user, this solution adjusts the display pixel density distribution of the display in combination with the vision information of the user and the interest level distribution information, which thus, on the basis of performing targeted adjustment according to the vision information of the user, reduces deformation such as a display scale possibly caused by a light field display image actually viewed by the corresponding user as much as possible, thereby improving display effects and user experience.

Further, optionally, the determining target pixel density distribution information according to the vision information and the interest level distribution information comprises: pre-processing the interest level distribution information according to the vision information to obtain light field interest level distribution information; and determining the target pixel density distribution information according to the light field interest level distribution information. In an application scene of displaying a light field image via a light field display device, pixels of the light field image sent to a display of the light field display device for display correspond to display pixels of the display. As resolution of different image regions of the sampled source image presents differential distribution, pixel or effective pixel distribution of the light field image corresponding to the sampled source image also presents differential distribution, and this solution determines light field interest level distribution information according to the vision information and the interest level distribution information, determines target pixel density distribution information of the display according to the light field interest level distribution information, and adjusts display pixel density distribution of the display according to the target pixel density distribution information, to cause actual distribution of display pixels of the adjusted display to correspond to distribution of pixels of the light field image as much as possible, thus reducing the probability of deformation of a display scale or the like of the image actually viewed by the user possibly caused by pixel density adjustment as much as possible.

For example, the interest level distribution information can be pre-processed in a manner of constructing a transform matrix according to vision information of the user, the pre-processed interest level distribution information might as well be called light field interest level distribution information, and a simplified physical model is as follows:

$$i' = P \times (l^d)' \quad (5)$$

In the above formula, i' indicates the sampled source image, $(l^d)'$ indicates the light field interest level distribution information to be calculated, and P indicates a transform matrix determined according to the vision information of the user; referring to the above formulas (2)-(4).

Figure 3F:
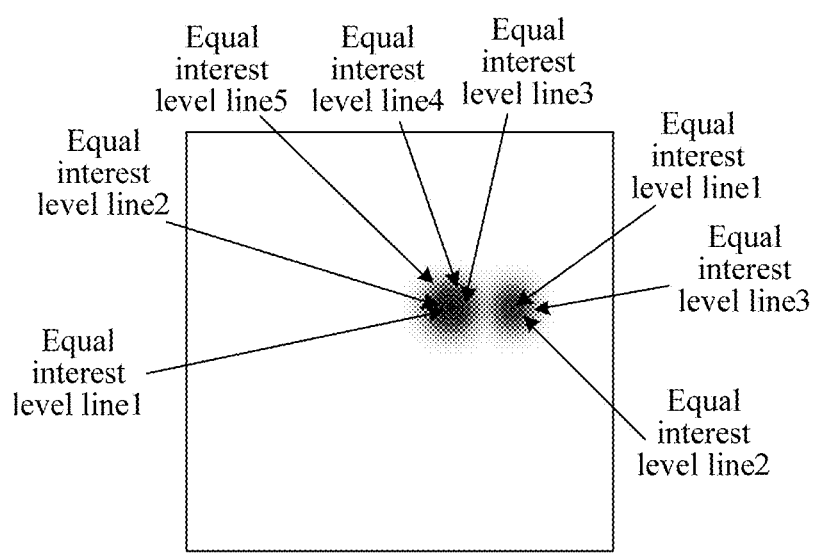
FIG. 3f is an example of a heat map of light field interest level distribution information according to one embodiment of the present application.

The light field interest level distribution information can be acquired according to the above formulas (2)-(5), that is, $(l^d)'$. An example of the light field interest level distribution information is as shown in FIG. 3f.

Figure 3G:
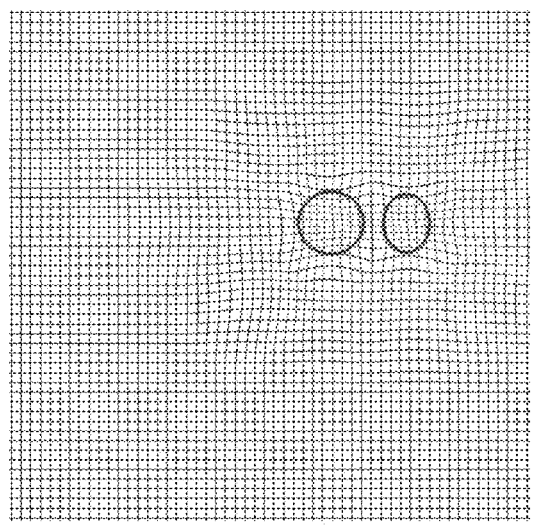
FIG. 3g is an example of target pixel density distribution information according to one embodiment of the present application.
Figure 4A:
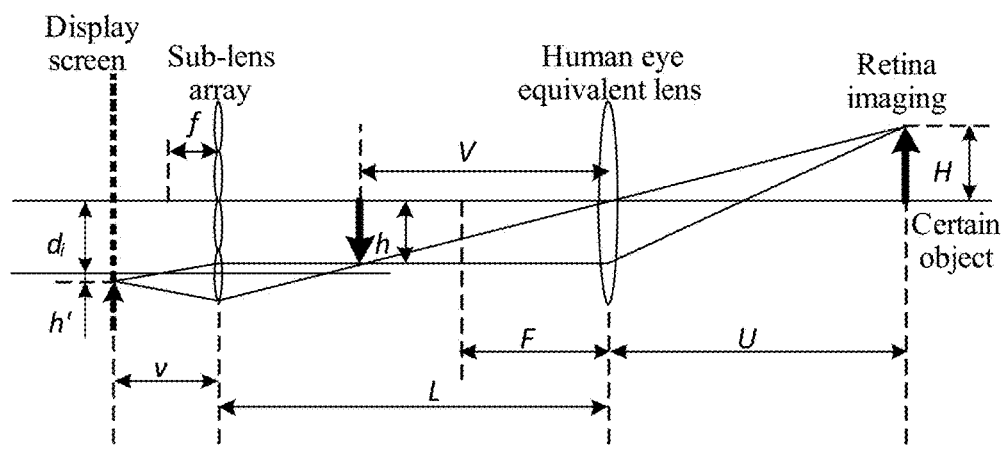
FIG. 4a is an example of another optical light path of light field display according to one embodiment of the present application.

After the light field interest level distribution information is acquired, target pixel density distribution information of the display can be determined according to the light field interest level distribution information. In some situations, a region within the same equal interest level line range corresponding to the interest level distribution information may correspond to multiple regions in the light field interest level distribution information, as shown in FIG. 3g, while the light field interest level distribution information corresponds to display pixel distribution of the adjusted display. Optionally, it is feasible to determine relative position information of various points within a certain equal interest level line range relative to a reference point of the interest level distribution information and determine corresponding regions of a region within the equal interest level line in the light field interest level distribution information. A reference point of the interest level distribution information can be flexibly selected according to actual needs, for example, the reference point may be, but is not limited to, a center of a region within an equal interest level line, the center may correspond to, but is not limited to, the center of an eye of a viewer, and so on. The various points in the interest level distribution information correspond to various pixel points of the source image, it might as well make the interest level distribution information equivalent to an image to be displayed, according to the optical imaging principle of imaging, an image formed on a retina of the user when the user views an image displayed by the display via the sub-lens array corresponds to the equivalent image to be displayed to a scale, therefore, a corresponding relationship between the equivalent image to be displayed and a display region of the display can be deduced according to imaging information of the retina, referring to FIG. 4a, the following relations can be obtained according to an imaging formula and a triangular geometry relationship:

$$\frac{1}{U} + \frac{1}{V} = \frac{1}{F} \quad (6)$$

$$\frac{1}{v} + \frac{1}{L-V} = \frac{1}{f} \quad (7)$$

$$\frac{H}{h} = \frac{U}{V} \quad (8)$$

$$\frac{d_i - h}{h'} = \frac{L-V}{v} \quad (9)$$

wherein U, V, L are respectively distances from an eyeball lens to a retina, to displayed imaging and to the sub-lens array, F, f are respectively focal lengths of an eyeball and a sub-lens, v is a distance from the sub-lens array to a display pixel, H, h, h' are respectively imaging sizes of a certain object on the retina, a virtual imaging surface and an imaging region corresponding to the ith sub-lens, $d_i$ is a distance from the ith sub-lens to a reference point, the reference point may be any point of the image, herein a point of intersection between an optical axis of the eyeball lens and the display is taken as an example to simplify calculation, and according to the formulas (6) to (9), the following formula can be obtained:

$$h' = \frac{(d_i U - LH)(v-f)}{fU} + \frac{Hv}{U} \quad (10)$$

Therefore, for any point imaged on the retina (suppose that a distance from the point to an optic center of the eyeball lens is H, the point is equivalent to a certain point corresponding to the equivalent image to be displayed, and H is equivalent to relative position information of the corresponding point relative to the equivalent image to be displayed and a reference point corresponding to the optic center of the eyeball lens), h' thereof on a corresponding imaging region of the ith sub-lens can be obtained through calculation, that is, an imaging point position thereof on the corresponding imaging region of the ith sub-lens can be obtained through mapping. A region within a certain equal interest level line corresponds to multiple points of an image region of retina imaging, h' on imaging regions respectively corresponding to the multiple points is obtained through calculation according to the method, a certain display region of the display can be determined, and a light field sub-image corresponding to the obtained display region in the light field interest level distribution information is a dense region to be adjusted, which corresponds to a region within the interest level line, in the light field interest level distribution information. In the target pixel density distribution information of the display determined according to the light field interest level distribution information, the target pixel density corresponding to the dense region to be adjusted may be big, while the target pixel density corresponding to other regions may be smaller.

Generally, the target pixel density distribution information is used to represent a user or device's relative expectation for display pixel density distribution of different display regions of the display, and corresponding to a display region with a greater light field interest level (that is, interest level), target pixel density is greater, to improve definition of image content displayed in the display region; corresponding to a display region with a smaller light field interest level, target pixel density may be relatively small, to adjust some display pixels of such display regions as display of other image content, so as to improve the overall utilization of display pixels of the display. Optionally, in the target pixel density distribution information, an average target pixel density corresponding to light field interest levels higher than a first threshold is higher than an average target pixel density corresponding to light field interest levels lower than a second threshold, the first threshold being greater than or equal to the second threshold. That is to say, a certain corresponding relationship exists between light field interest levels in the light field interest level distribution information and target pixel densities in the target pixel density distribution information, the corresponding relationship can be determined according to actual needs, and the implementation is very flexible. For example, different target pixel densities can be determined for different light field interest levels; or, for another example, one or more light field interest level thresholds can be determined, for example, the first threshold and/or the second threshold, and corresponding average target pixel densities are determined for light field interest levels higher than or lower than a relative threshold, thus improving flexibility of adjustment of actual display pixels.

Figure 3H:
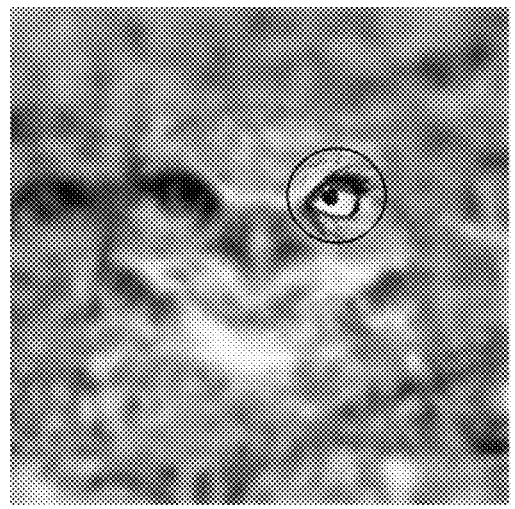
FIG. 3h is an example of display effects of an image with differential definition distribution according to one embodiment of the present application.
Figure 4B:
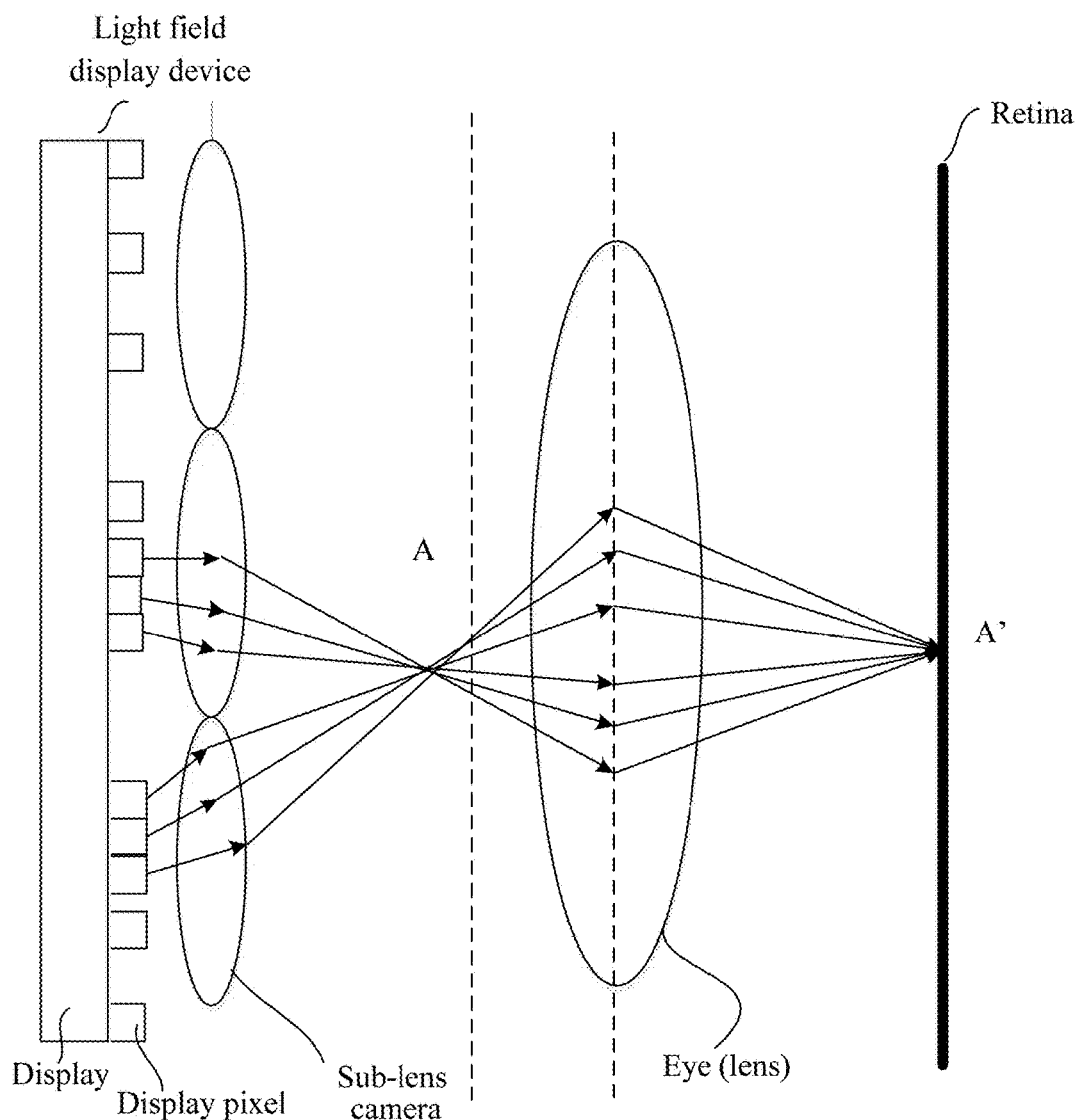
FIG. 4b is an example of an optical light path of light field display based on an adjusted display according to one embodiment of the present application.

After the target pixel density distribution information is acquired, pixel density distribution of the display can be adjusted according to the target pixel density distribution information. Display pixel density adjustment is performed on the display according to the target pixel density distribution information, to cause distribution of actual display pixel densities of the adjusted display to be the same as the target pixel density distribution information or zoomed to a scale or be as close as possible, in this way, in a process of performing light field image display via the adjusted light field display device, image content corresponding to a higher interest level may have more display pixels for display than image content with a lower interest level, equivalent to re-adjusting existing pixels of the display, an optional light path of the light field display after adjustment of display pixel density distribution is as shown in FIG. 4b, thus achieving differential distribution of spatial resolution of different regions of an image actually displayed via the adjusted light field display device, as shown in FIG. 3h, local parts (such as parts whose interest level is greater than a first threshold) are clear while local parts (such as parts whose interest level is lower than a second threshold) are less clear, and actual display efficiency of the display pixels is improved. The manner of adjusting pixel density distribution of the display can be selected according to actual needs, which is not limited in the embodiment of the present application. In one optional implementation manner, it is feasible to determine deformation control information of a controllable deformed material portion according to the target pixel density distribution information; and control the controllable deformed material portion to produce deformation according to the deformation control information, so as to correspondingly adjust the display pixel density distribution of the display through the deformation of the controllable deformed material portion. This solution adjusts pixel density of the display by controlling deformation of a controllable deformed material portion, which is simple and easy to implement.

Figure 1B:
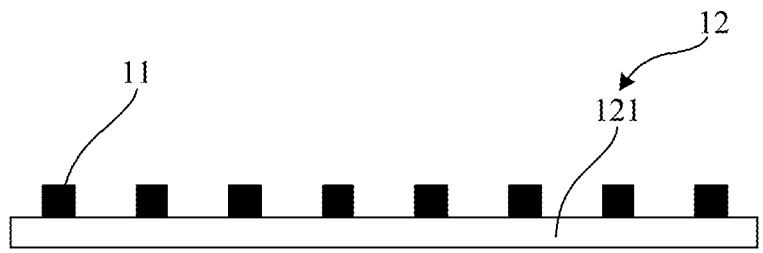
FIG. 1b is a schematic structural diagram of a first display with adjustable pixel density according to one embodiment of the present application.

FIG. 1b is a schematic structural diagram of a display with adjustable pixel density according to one embodiment of the present application. As shown in FIG. 1b, the display with adjustable pixel density according to the embodiment of the present application comprises: multiple display pixels 11 and a controllable deformed material portion 12, wherein the display performs image display through the display pixels 11, the multiple display pixels 11 are array-distributed, and the controllable deformed material portion 12 is connected with the multiple display pixels 11 respectively; the controllable deformed material portion 12 may produce deformation under the action of an external field, and density distribution of the multiple display pixels 11 is correspondingly adjusted through the deformation of the controllable deformed material portion 12. The controllable deformed material portion can produce deformation by changing a certain external effect factor (such as an external field) acting on the controllable deformed material portion, and when the external field acting thereon is cancelled or changed, the deformation of the controllable deformed material portion can be restored. One of the display pixels may comprise, but is not limited to, at least one light-emitting unit; the light-emitting unit may comprise, but is not limited to, a LED light-emitting unit and an OLED light-emitting unit; emitting color of one of the light-emitting units may be determined according to actual needs, which may comprise, but is not limited to, one or more light-emitting sub-units, and the light-emitting sub-units may comprise LED light-emitting sub-units and OLED light-emitting sub-units; and the multiple light-emitting sub-units may comprise, but are not limited to, LED light-emitting sub-units and OLED light-emitting sub-units in different colors such as red (R), green (G) and blue (B).

In the multiple display pixels array-distributed comprised in the display provided in the embodiment of the present application, each of the display pixels and the controllable deformed material portion may be closely connected in a manner which comprises, but is not limited to, adhesion, in this way, when the controllable deformed material portion produces deformation, spacing between the display pixels will be adjusted correspondingly, thus changing density distribution of the display pixels and achieving the effect of giving differential display pixel density distribution to different regions of the display according to actual requirements.

During actual applications of the technical solution provided in the embodiments of the present application, an unevenly distributed external field can act on different regions of the controllable deformed material portion, to cause different regions of the controllable deformed material portion to produce deformation differently, thus adjusting the overall density distribution of the display pixels. Optionally, the external field can act on a region where the controllable deformed material portion and the multiple display pixels do not overlap, to cause a region where the controllable deformed material portion and the multiple display pixels overlap not to produce deformation, and the display pixel density distribution is changed through deformation of other parts of the controllable deformed material portion; this solution helps to avoid damage to the display pixels caused by deformation of the controllable deformed material portion.

Further, at least one suitable controllable deformed material can be selected as required to prepare the controllable deformed material portion, to cause the controllable deformed material portion to have characteristics of being deformable and having recoverable deformation. Optionally, the controllable deformed material portion may be at least prepared from at least one or more of the following controllable deformed materials: piezoelectric materials, electroactive polymers, photodeformation materials and magnetostriction materials.

The piezoelectric materials may produce mechanical deformation due to the action of an electric field. The controllable deformed material portion prepared from the piezoelectric materials is hereinafter referred to as a piezoelectric material portion. By use of such a physical property of the piezoelectric material, the embodiment of the present application can determine electric field control information configured to make the piezoelectric material portion produce corresponding mechanical deformation according to, but not limited to, the target pixel density distribution information, control an electric field acting on the piezoelectric material portion according to the electric field control information, to cause the piezoelectric material portion to produce corresponding mechanical deformation, and correspondingly adjust pixel density distribution of the display through the mechanical deformation of the piezoelectric material portion, thus achieving the purpose of adjusting pixel density distribution of the display according to the target pixel density distribution information. The piezoelectric materials may comprise, but are not limited to, at least one of the following: piezoelectric ceramic and piezoelectric crystal. This solution can make full use of the physical property of the piezoelectric material to adjust pixel density distribution of the display.

The Electroactive Polymers (referred to as EAPs) are one kind of polymer materials that can change their shapes or sizes under the action of an electric field. The controllable deformed material portion prepared from the EAPs is hereinafter referred to as an EAP portion. By use of such a physical property of the EAPs, the embodiment of the present application can determine electric field control information configured to make the EAP portion produce corresponding deformation according to, but not limited to, the target pixel density distribution information, control an electric field acting on an EAP layer according to the electric field control information, to cause the EAP layer to produce corresponding deformation, and correspondingly adjust pixel density distribution of the display through the deformation of the EAP layer, thus achieving the purpose of adjusting pixel density distribution of the display according to the target pixel density distribution information. The EAP materials may comprise, but are not limited to, at least one of the following: electronic EAPs and ionic EAPs; the electronic EAPs comprise at least one of the following: ferroelectric polymers (such as polyvinylidene fluoride), electrostrictive grafted elastomers and liquid crystal elastomers; and the ionic EAPs comprise at least one of the following: electrorheological fluids, ionic polymer-metallic composite materials and the like. This solution can make full use of the physical property of the EAPs to adjust pixel density distribution of the display.

The photodeformation materials are one kind of polymer materials that can change their shapes or sizes under the action of a light field. The controllable deformed material portion prepared from the photodeformation materials is hereinafter referred to as a photodeformation material portion. By use of such a physical property of the photodeformation materials, the embodiment of the present application can determine light field control information configured to make the photodeformation material portion produce corresponding deformation according to, but not limited to, the target pixel density distribution information, control a light field acting on the photodeformation material portion according to the light field control information, to cause the photodeformation material portion to produce corresponding deformation, and correspondingly adjust pixel density distribution of the display through the deformation of the photodeformation material portion, thus achieving the purpose of adjusting pixel density distribution of the display according to the target pixel density distribution information. The photodeformation materials may comprise, but are not limited to, at least one of the following: photostrictive ferroelectric ceramics and photodeformation polymers; the photostrictive ferroelectric ceramics may comprise, but are not limited to, lead lanthanum zirconate titanate (PLZT) ceramics, and the photodeformation polymers may comprise, but are not limited to, photodeformation liquid crystal elastomers. The solution can make full use of the physical property of the photodeformation material to adjust pixel density distribution of the display.

The magnetostriction materials are one kind of magnetic materials that can change a magnetization state thereof under the action of a magnetic field and then change their sizes. The controllable deformed material portion prepared from the magnetostriction materials is hereinafter referred to as a magnetostriction material portion. By use of such a physical property of the magnetostriction materials, the embodiment of the present application can determine magnetic field control information configured to make the magnetostriction material produce corresponding deformation according to, but not limited to, the target pixel density distribution information, control a magnetic field acting on the magnetostriction material portion according to the magnetic field control information, to cause the magnetostriction material portion to produce corresponding deformation, and correspondingly adjust pixel density distribution of the display through the deformation of the magnetostriction material portion, thus achieving the purpose of adjusting pixel density distribution of the display according to the target pixel density distribution information. The magnetostriction materials may comprise, but are not limited to, rare-earth giant magnetostrictive materials, such as alloy $Tbo_{0.3}Dy_{0.7}Fe_{1.95}$ materials using a $(Tb,Dy)Fe_2$ compound as a substrate. This solution can make full use of the physical property of the magnetostriction material to adjust pixel density distribution of the display.

In the technical solution provided in the embodiment of the present application, specific structures and connecting modes of the display pixels and the controllable deformed material portion can be determined according to actual requirements, and the actual modes are very flexible.

In one optional implementation, as shown in FIG. 1b, the controllable deformed material portion 12 comprises: a controllable deformed material layer 121, the multiple display pixels 11 being array-distributed and connected to one side of the controllable deformed material layer 121. Optionally, it is feasible to choose to directly from the multiple display pixels on the controllable deformed material portion 12 according to actual process conditions, or the multiple display pixels and the controllable deformed material portion 12 can be prepared respectively and can be closely connected in a manner which comprises, but is not limited to, adhesion. The solution has a simple structure and is easy to implement.

Figure 1C:
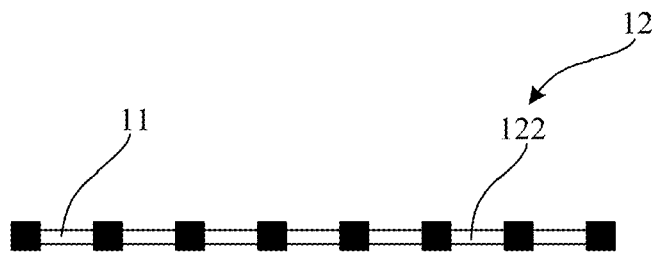
FIG. 1c is a schematic structural diagram of a second display with adjustable pixel density according to one embodiment of the present application.

In another optional implementation, as shown in FIG. 1c, the controllable deformed material portion 12 comprises multiple controllable deformed material connecting sub-portions 122, the multiple controllable deformed material connecting sub-portions 122 being array-distributed, so as to correspondingly connect the multiple display pixels 11 array-distributed, that is, the multiple display pixels array-distributed are connected into one piece through the multiple controllable deformed material connecting sub-portions array-distributed. Optionally, the multiple controllable deformed material connecting sub-portions can be formed in spacing regions of pixels of a display pixel array according to an actual process, and the multiple controllable deformed material connecting sub-portions and the corresponding display pixels may be connected in a manner which comprises, but is not limited to, abutment and adhesion. The density distribution of the display pixels can be adjusted by controlling deformation of the multiple controllable deformed material connecting sub-portions; the structure is simple and is easy to implement.

Figure 1D:
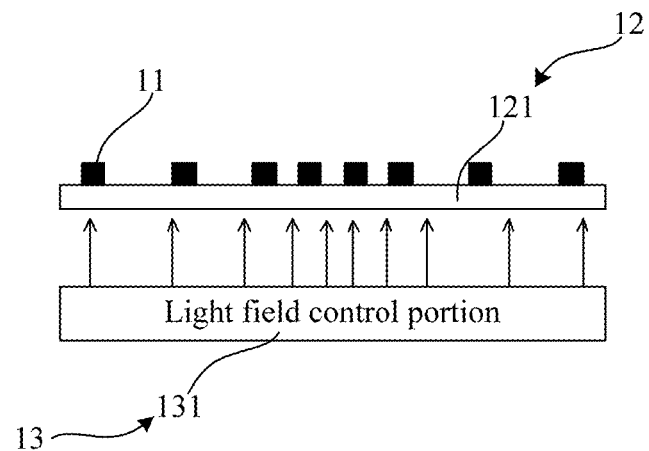
FIG. 1d is a schematic structural diagram of a third display with adjustable pixel density according to one embodiment of the present application.
Figure 1E:
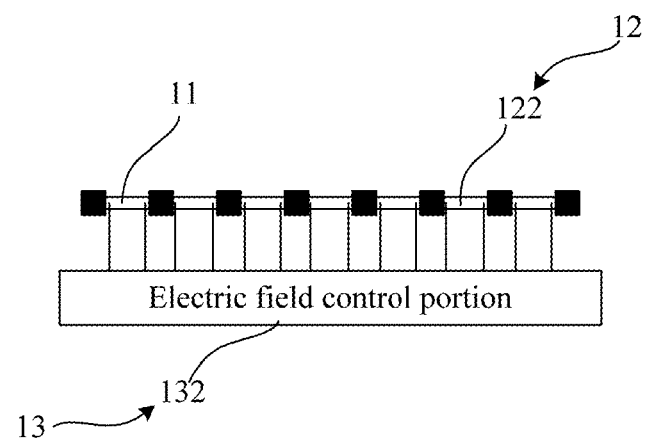
FIG. 1e is a schematic structural diagram of a fourth display with adjustable pixel density according to one embodiment of the present application.

Further, as shown in FIG. 1d and FIG. 1e, the display may further comprise: a deformation control portion 13, wherein the deformation control portion 13 is configured to adjust distribution of the external field acting on the controllable deformed material portion 12, so as to control the controllable deformed material portion 12 to produce corresponding deformation, in this way, when the controllable deformed material portion 12 produces deformation, the spacing between the display pixels 11 may be adjusted correspondingly, thus changing density distribution of the display pixels 11 and achieving the effect of giving differential display pixel density distribution to different regions of the display according to actual requirements.

Optionally, as shown in FIG. 1d, the deformation control portion may comprise a light field control portion 131, wherein the light field control portion 131 is configured to adjust distribution of an external light field acting on the controllable deformed material portion 12, so as to control the controllable deformed material portion 12 to produce corresponding deformation. In this case, the controllable deformed material portion 12 may comprise a photodeformation material portion at least prepared from photodeformation materials, for example, the photodeformation material portion may comprise a photodeformation material layer at least prepared from the photodeformation materials, or the controllable deformed material portion may comprise multiple photodeformation material connecting sub-portions at least prepared from the photodeformation materials. The light field control portion 131 excites different regions of the controllable deformed material portion 12 to produce deformation differently by changing light field distribution acting on the photodeformation material portion (in FIG. 1d, the light field with different intensity distribution acting on the controllable deformed material portion 12 is represented through arrow density), and the spacing between the display pixels 11 is adjusted correspondingly through the deformation of the controllable deformed material portion 12, thus changing density distribution of the display pixels 11 and achieving the effect of giving differential display pixel density distribution to different regions of the display according to actual requirements.

Figure 1F:
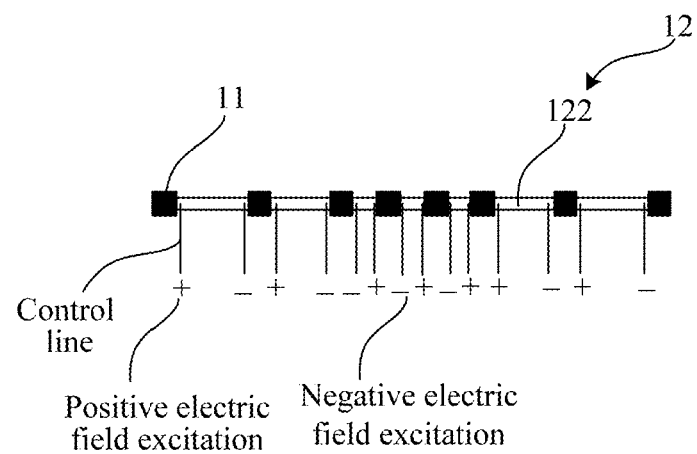
FIG. 1f is an example of a scene where a display adjusts pixel density in the event of uneven light field excitation according to one embodiment of the present application.

Optionally, as shown in FIG. 1e, the deformation control portion comprises an electric field control portion 132, wherein the electric field control portion 132 is configured to adjust distribution of an external electric field acting on the controllable deformed material portion, so as to control the controllable deformed material portion to produce corresponding deformation. In this case, the controllable deformed material portion 12 may comprise a piezoelectric material portion at least prepared from piezoelectric materials (such as a piezoelectric material layer or a piezoelectric material connecting sub-portion), or the controllable deformed material portion 12 may comprise an EAP portion at least prepared from EAPs (such as an EAP layer or an EAP connecting sub-portion). As shown in FIG. 1e, the electric field control portion and the controllable deformed material can be connected through a control line, and the electric field control portion 132 excites different regions of the controllable deformed material portion 12 to produce deformation differently by changing electric field distribution acting on the controllable deformed material portion. If the electric field acting on the controllable deformed material portion 12 is a zero field, the controllable deformed material portion does not produce deformation (might as well be called zero field excitation); if intensity distribution of the electric field acting on the controllable deformed material portion 12 (for example, "+" positive electric field excitation and "−" negative electric field excitation shown in FIG. 1e) is changed to cause the intensity of the electric field acting on different regions of the controllable deformed material portion 12 to vary, as shown in FIG. 1f, in this way, the different regions of the controllable deformed material portion may produce deformation differently, and the spacing between the display pixels 11 is adjusted correspondingly through the deformation of the controllable deformed material portion 12, thus changing the overall pixel density distribution of the display and achieving the effect of giving differential display pixel density distribution to different regions of the display according to actual requirements.

In the embodiment of the present application, the controllable deformed portion and the deformation control portion may be directly or indirectly connected. The deformation control portion may serve as a part of the display, or the deformation control portion may not serve as a part of the display, and the display may also be connected with the deformation control portion through a reserved pin or interface or the like. The external field acting on the controllable deformed material portion may comprise, but is not limited to, an electric field, a magnetic field, a light field and the like. A hardware or software structure configured to produce the electric field, a hardware or software structure configured to produce the magnetic field, a hardware or software structure configured to produce the light field and the like can be achieved by using corresponding existing technologies according to actual requirements, which is not repeated herein in the embodiments of the present application.

Figure 1G:
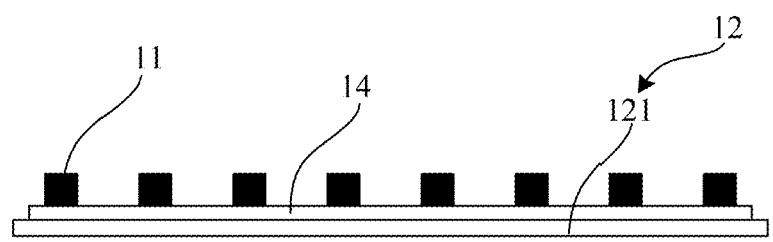
FIG. 1g is a schematic structural diagram of a fifth display with adjustable pixel density according to one embodiment of the present application.
Figure 1H:
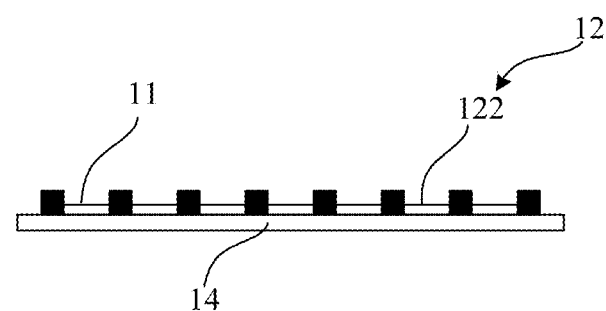
FIG. 1h is a schematic structural diagram of a sixth display with adjustable pixel density according to one embodiment of the present application.

Optionally, the display may further comprise a flexible substrate, and the flexible substrate may comprise, but is not limited to, a flexible plastic substrate, which has certain flexibility and can change the shape of the flexible substrate according to requirements. The display pixels and the controllable deformed material portion may be disposed on the same side or different sides of the flexible substrate. For example, as shown in FIG. 1g, the multiple display pixels 11 are connected to one side of the flexible substrate 14, and the controllable deformed material portion (for example, the controllable deformed material layer 121) is connected to the other side of the flexible substrate 14. For another example, as shown in FIG. 1h, the multiple display pixels 11 are connected to one side of the flexible substrate 14, and the controllable deformed material portion (for example, the controllable deformed material connecting sub-portion 122) is connected to the corresponding display pixel and is located on the same side of the flexible substrate 14 with the display pixel 11. This solution not only can indirectly adjust the overall pixel density distribution of the display by controlling its deformation through the external field acting on the controllable deformed material portion, to achieve adjustable pixel density of the display, but also can flexibly change the shape of the display due to use of the flexible substrate, for example, a plane display is bent to a certain angle to obtain a surface display, thus meeting application demands such as diversified image display and decoration.

Figure 1I:
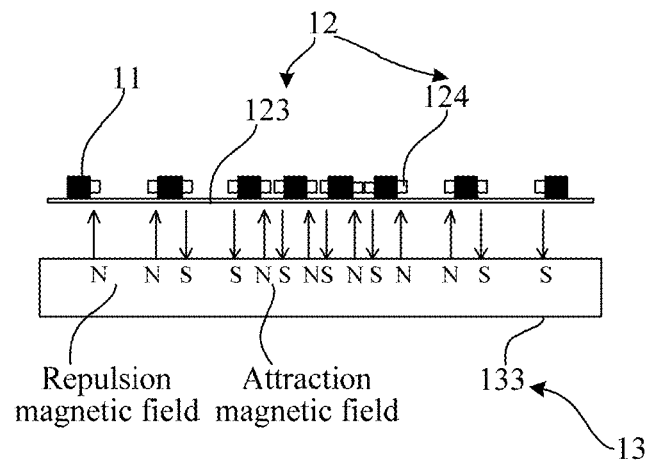
FIG. 1i is a schematic structural diagram of a seventh display with adjustable pixel density according to one embodiment of the present application.

FIG. 1i is a schematic structural diagram of a seventh display with adjustable pixel density according to one embodiment of the present application. In the display as shown in FIG. 1i, the controllable deformed material portion 12 comprises: a flexible substrate 123 and multiple permeability magnetic material portions 124; the multiple display pixels 11 are respectively connected with the flexible substrate 123, at least a part of the display pixels 11 are connected with the multiple permeability magnetic material portions 124, the flexible substrate 123 produces corresponding deformation by changing a magnetic field acting on the permeability magnetic material portions 124, and density distribution of the multiple display pixels 11 is correspondingly adjusted through the deformation. For example, a permeability magnetic material portion 124 can be disposed on a side face of each display pixel, and optionally, the display pixel 11 is respectively adhered to the flexible substrate 123 and the permeability magnetic material portion 124. The permeability magnetic material portion may comprise a magnetic pole prepared from a permeability magnetic material, and the permeability magnetic material may comprise, but is not limited to, one or more of a soft magnetic material, a silicon steel sheet, a permalloy, ferrite, an amorphous soft magnetic alloy, and a super-microcrystalline soft magnetic alloy. The permeability magnetic material portion prepared from the soft magnetic material may have higher permeability, and small residual magnetization after cancellation of the magnetic field, which facilitates next adjustment.

Further, optionally, the deformation control portion 13 in the embodiment of the present application may further comprise: a magnetic field control portion 133, wherein the magnetic field control portion 133 is configured to adjust distribution of an external magnetic field acting on the controllable deformed material portion, so as to control the controllable deformed material portion to produce corresponding deformation. For example, when the magnetic field control portion 133 controls the magnetic field (that is, excitation magnetic field) acting on the permeability magnetic material portion 124, as shown in FIG. 1i, a like magnetic pole (NN or SS) repulsion magnetic field or an unlike magnetic pole (NS or SN) attraction magnetic field with certain magnetic field intensity distribution is applied between adjacent display pixels, the poles may produce a corresponding repelling force or attracting force therebetween, the magnetic force is transferred to the flexible substrate 123 to make the flexible substrate 123 produce deformation such as expansion and contraction, thereby resulting in that the spacing between the corresponding display pixels changes and achieving the purpose of adjusting display pixel density distribution. This solution achieves adjustable pixel density distribution of the display in combination with scalable deformation characteristics of the flexible substrate and the magnetic field control principle.

Figure 1J:
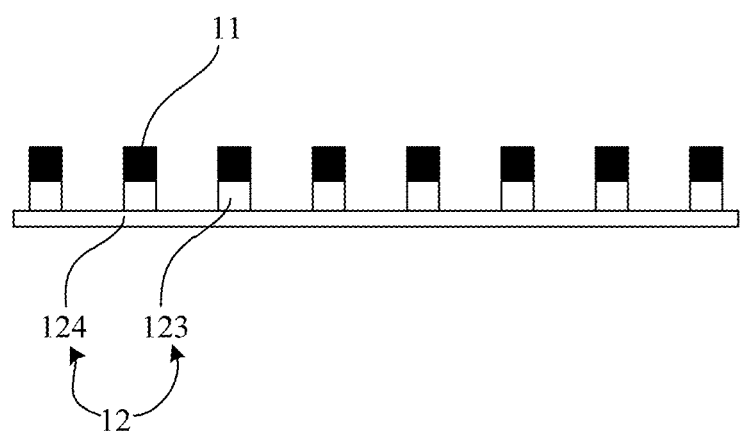
FIG. 1j is a schematic structural diagram of an eighth display with adjustable pixel density according to one embodiment of the present application.

FIG. 1j is a schematic structural diagram of an eighth display with adjustable pixel density according to one embodiment of the present application. In the display as shown in FIG. 1j, the controllable deformed material portion 12 comprises: a flexible substrate 123 and multiple permeability magnetic material portions 124; one side of the multiple permeability magnetic material portions 124 is respectively connected with the flexible substrate 123, an opposite face of the multiple permeability magnetic material portions 124 is respectively connected with the multiple display pixels 11 correspondingly, the flexible substrate 123 produces corresponding deformation by changing a magnetic field acting on the permeability magnetic material portions 124, and density distribution of the multiple display pixels 11 is correspondingly adjusted through the deformation. Optionally, the permeability magnetic material portions 124 are adhered to the flexible substrate 123, the display pixels 11 are adhered to the permeability magnetic material portions 124, and when the magnetic field acting on the permeability magnetic material portions 124 changes, the magnetic force is transferred to the flexible substrate 123 to make the flexible substrate 123 produce deformation such as expansion and contraction, thereby achieving the purpose of adjusting display pixel density distribution. This solution achieves adjustable pixel density distribution of the display in combination with scalable deformation characteristics of the flexible substrate and the magnetic field control principle.

After display pixel distribution of the display has been adjusted, the light field image is sent to the display, and is displayed through the display. If the light field image displayed by the display is directly seen without the sub-lens array of the light field display device, the image seen is a blurred image. If the light field image displayed by the display is seen via the sub-lens array of the light field display device, the image seen is an image in which definition of different image regions presents differential distribution, as shown in FIG. 3h, definition of image regions corresponding to higher interest levels is higher, while definition of other image regions is lower.

Use of the technical solution provided in the embodiment of the present application can achieve adjusting pixel density distribution of the display at least according to the interest level distribution information, performs, based on the display with adjustable pixel density, light field image display related to the source image sampled differently based on the interest level distribution information, can make full use of overall pixels of the display to differently present display definition of different regions of the image, and improves actual utilization of display pixels, thus helping to meet users' diversified actual demands.

Optionally, the light field display control method further comprises: in the course of displaying the light field image via the adjusted light field display device, performing balancing control on display brightness of different display regions of the display. As display pixel density distribution of the display of the light field display device has been adjusted, display pixel distribution of the adjusted display is uneven, some parts have great display pixel density while some parts have small display pixel density, for display regions with great display pixel density, brightness of the part of image content presented to the user via corresponding sub-lenses may be greater, while for display regions with small display pixel density, brightness of the part of image content presented to the user via corresponding sub-lenses may be less, resulting in that overall brightness distribution of the light field image may be unbalanced. If such a display effect of unbalanced brightness distribution is the display effect pursued by the user, or such a display effect of unbalanced brightness distribution is not concerned by the user, and so on, brightness balancing control may not be performed; otherwise, it is feasible to, in the course of displaying the sampled light field image via the adjusted light field display device, perform balancing control on display brightness of different display regions of the display, for example, properly reduce brightness of the display region with great display pixel density and/or properly increase brightness of the display region with small display pixel density, to reduce brightness differences between different parts of the light field image actually displayed, thus improving viewing effects and user experience.

It should be understood by those skilled in the art that, in any one of the foregoing methods of the specific implementations of the present application, the value of the serial number of each step described above does not mean an execution sequence, and the execution sequence of each step should be determined according to the function and internal logic thereof, and should not be any limitation to the implementation procedure of the specific implementations of the present application.

Figure 5:
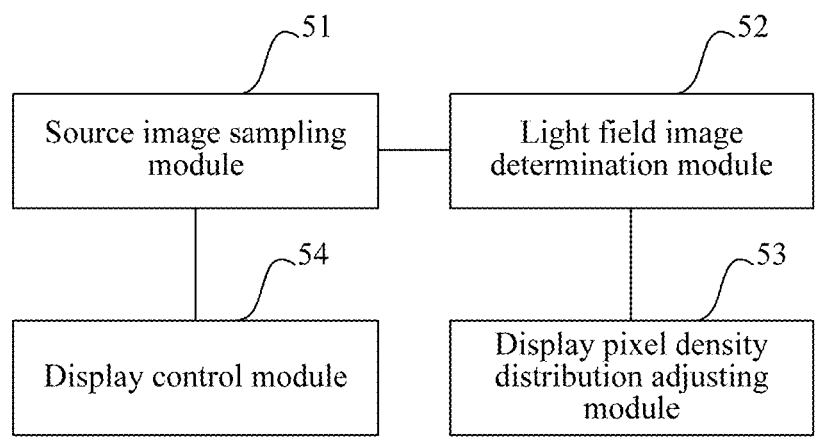
FIG. 5 is a logic block diagram of a first light field display control apparatus according to one embodiment of the present application.

FIG. 5 is a logic block diagram of a first light field display control apparatus according to one embodiment of the present application. As shown in FIG. 5, the light field display control apparatus according to an embodiment of the present application may comprise: a source image sampling module 51, a light field image determination module 52, a display pixel density distribution adjusting module 53 and a display control module 54.

The source image sampling module 51 is configured to sample a source image according to interest level distribution information of the source image.

The light field image determination module 52 is configured to determine a light field image corresponding to the sampled source image.

The display pixel density distribution adjusting module 53 is configured to adjust display pixel density distribution of a display of a light field display device at least according to the interest level distribution information.

The display control module 54 is configured to display the light field image via the adjusted light field display device.

The light field display control apparatus may perform image display control by executing the light field display control method during applications, which comprise, but are not limited to, image presentation and video playback. Device manifestations of the light field display control apparatus are not limited, for example, the light field display control apparatus may be a certain separate component, and the component cooperates with the light field display device comprising a display; or the light field display control apparatus may be integrated, as a certain functional module, into a display device comprising a display, and the light field display device may include, but is not limited to, TVs, computers, cameras, mobile phones, video recorders and the like which have light field display capability and comprise the display.

The technical solution provided in the embodiment of the present application can make full use of pixels of the display of the light field display device to present differential spatial resolution of different regions of a light field image, thus meeting users' differential display demands for local definition of an image, improving display efficiency and meeting the users' diversified actual application demands. In addition, the technical solution provided in the embodiments of the present application samples the source image at least according to interest level distribution information and adjusts display pixel density distribution of the display, in order to reduce deformation such as a display scale of a local region of an actual display image possibly caused by the source image and differential distribution of pixels of the display, thus improving display effects and enhancing user experience.

Figure 6:
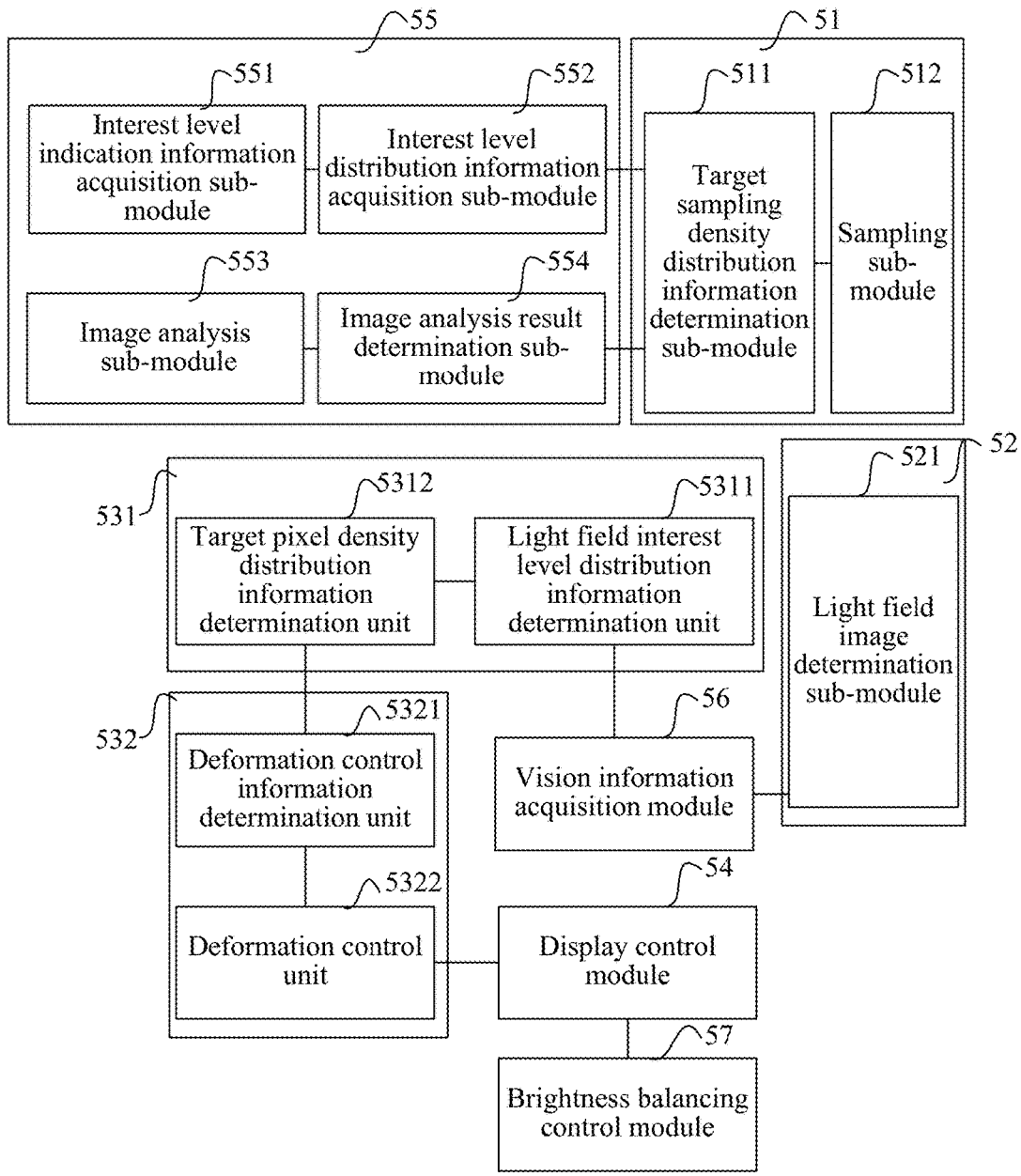
FIG. 6 is a logic block diagram of a second light field display control apparatus according to one embodiment of the present application.

Optionally, as shown in FIG. 6, the light field display control apparatus further comprises: an interest level distribution information acquisition module 55. The interest level distribution information acquisition module 55 is configured to acquire the interest level distribution information of the source image. The manner of acquiring the interest level distribution information may be determined according to actual needs and is very flexible.

Optionally, the interest level distribution information acquisition module 55 comprises: an interest level indication information acquisition sub-module 551 and an interest level distribution information acquisition sub-module 552. The interest level indication information acquisition sub-module 551 is configured to acquire interest level indication information of the source image; and the interest level distribution information acquisition sub-module 552 is configured to determine the interest level distribution information according to the interest level indication information. The solution determines interest level distribution information of the source image according to the interest level indication information, to cause determination of the interest level distribution information to be more consistent with actual user demands, which can better meet users' personalized application demands.

Optionally, the interest level distribution information acquisition module 55 comprises: an image analysis sub-module 553 and an image analysis result determination sub-module 554. The image analysis sub-module 553 is configured to perform image analysis on the source image; and the image analysis result determination sub-module 554 is configured to determine the interest level distribution information according to a result of the image analysis. The solution can automatically determine the interest level distribution information according to a result of the image analysis on the source image, to cause determination of the interest level distribution information to be more intelligent, thereby improving efficiency and universality of the determination of the interest level distribution information.

Optionally, the source image sampling module 51 comprises: a target sampling density distribution information determination sub-module 511 and a sampling sub-module 512. The target sampling density distribution information determination sub-module 511 is configured to determine target sampling density distribution information according to the interest level distribution information, at least two target sampling densities in the target sampling density distribution information, which respectively correspond to different interest levels, are different; and the sampling sub-module 512 is configured to sample the source image according to the target sampling density distribution information. Optionally, an average target sampling density corresponding to interest levels higher than a first threshold is higher than an average target sampling density corresponding to interest levels lower than a second threshold, the first threshold being greater than or equal to the second threshold. This solution can achieve differential sampling of the source image, to cause differential distribution of pixels or resolution of the sampled source image to match differential interest level distribution of the source image.

Optionally, the light field image determination module 52 comprises: a light field image determination sub-module 521. The light field image determination sub-module 521 is configured to pre-process the sampled source image according to vision information of a user to obtain the light field image. The solution not only can be applied to pre-processing scenes of a light field image corresponding to an image viewed in terms of a user with normal vision, but also can be applied to pre-processing of a light field image corresponding to an image viewed in terms of a user whose vision needs to be corrected (such as nearsightedness and farsightedness), and the implementation is flexible.

Optionally, the display pixel density distribution adjusting module 53 comprises: a target pixel density distribution information determination sub-module 531 and a display pixel density distribution adjusting sub-module 532. The target pixel density distribution information determination sub-module 531 is configured to determine target pixel density distribution information of the display according to the vision information of the user and the interest level distribution information, at least two target pixel densities in the target pixel density distribution information, which respectively correspond to different interest levels, are different; and the display pixel density distribution adjusting sub-module 532 is configured to adjust the display pixel density distribution of the display according to the target pixel density distribution information. This solution helps to reduce the probability of deformation of a display scale or the like of the image actually viewed by the user possibly caused by pixel density adjustment.

Optionally, the target pixel density distribution information determination sub-module 531 comprises: a light field interest level distribution information determination unit 5311 and a target pixel density distribution information determination unit 5312. The light field interest level distribution information determination unit 5311 is configured to pre-process the interest level distribution information according to the vision information to obtain light field interest level distribution information; and the target pixel density distribution information determination unit 5312 is configured to determine the target pixel density distribution information according to the light field interest level distribution information. Optionally, an average target pixel density corresponding to light field interest levels higher than a first threshold is higher than an average target pixel density corresponding to light field interest levels lower than a second threshold, the first threshold being greater than or equal to the second threshold. The solution determines light field interest level distribution information according to the vision information and the interest level distribution information, determines target pixel density distribution information of the display according to the light field interest level distribution information, and adjusts display pixel density distribution of the display according to the target pixel density distribution information, to cause actual distribution of display pixels of the adjusted display to correspond to distribution of pixels of the light field image as much as possible, thus reducing the probability of deformation of a display scale or the like of the image actually viewed by the user possibly caused by pixel density adjustment as much as possible.

Optionally, the display pixel density distribution adjusting sub-module 532 comprises: a deformation control information determination unit 5321 and a deformation control unit 5322. The deformation control information determination unit 5321 is configured to determine deformation control information of a controllable deformed material portion according to the target pixel density distribution information; and the deformation control unit 5322 is configured to control the controllable deformed material portion to produce deformation according to the deformation control information, so as to correspondingly adjust the display pixel density distribution of the display through the deformation of the controllable deformed material portion. Optionally, the controllable deformed material portion is at least prepared from at least one or more of the following controllable deformed materials: piezoelectric materials, electroactive polymers, photodeformation materials and magnetostriction materials. Implementation manners of this solution are simple.

Optionally, the light field display control apparatus further comprises: a vision information acquisition module 56. The vision information acquisition module 56 is configured to acquire vision information of the user. This solution can perform targeted control on differential presentation of image display resolution by acquiring vision information of the user, and further helps to achieve dynamic display control according to changes of the vision information of the user.

Optionally, the light field display control apparatus further comprises: a brightness balancing control module 57. The brightness balancing control module 57 is configured to, in the course of displaying the light field image via the adjusted light field display device, perform balancing control on display brightness of different display regions of the display. This solution helps to reduce brightness differences between different parts of the light field image actually displayed, thus improving viewing effects and user experience.

Figure 7:
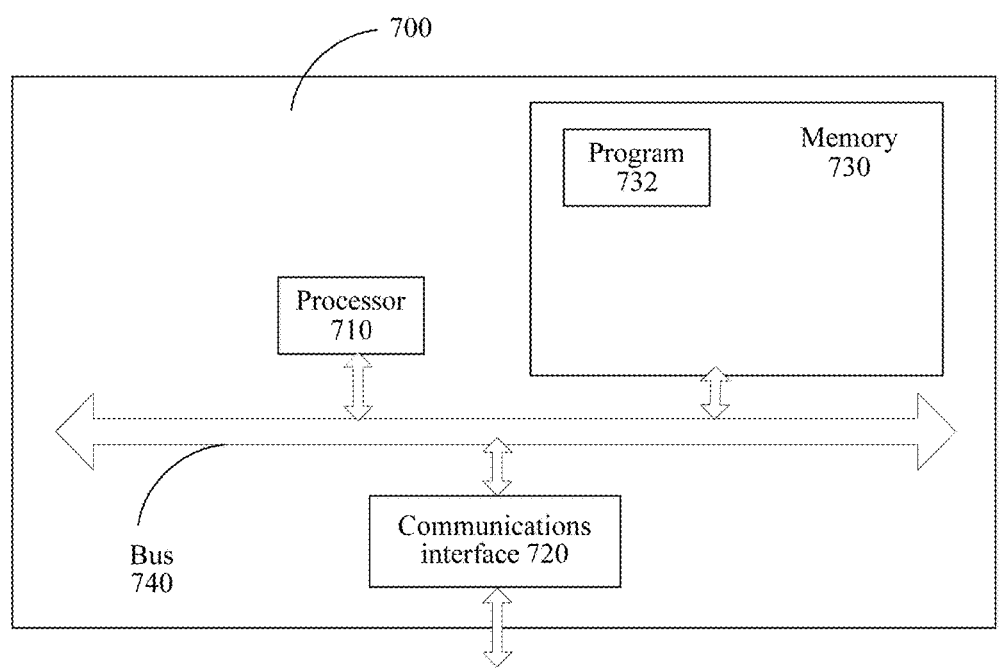
FIG. 7 is a schematic structural diagram of a third light field display control apparatus according to one embodiment of the present application.

FIG. 7 is a schematic structural diagram of a third light field display control apparatus according to one embodiment of the present application; the specific embodiment of the present application does not limit specific implementations of the light field display control apparatus 700. As shown in FIG. 7, the light field display control apparatus 700 may comprise:

a processor 710, a Communications Interface 720, a memory 730, and a communications bus 740.

The processor 710, the Communications Interface 720, and the memory 730 accomplish mutual communications via the communications bus 740.

The Communications Interface 720 is configured to communicate with, for example, devices or external light sources with a communications function.

The processor 710 is configured to execute a program 732, and specifically, can implement relevant steps in any embodiment of the light field display control method.

For example, the program 732 may comprise a program code, the program code comprising computer operation instructions.

The processor 710 may be a central processing unit (CPU), or an application specific integrated circuit (ASIC), or be configured to be one or more integrated circuits which implement the embodiments of the present application.

The memory 730 is configured to store the program 732. The memory 730 may comprise a high-speed Random Access Memory (RAM) memory, and may also comprise a non-volatile memory, for example, at least one magnetic disk memory.

For example, in one optional implementation, the processor 710 may perform the following steps by executing the program 732: sampling a source image according to interest level distribution information of the source image; determining a light field image corresponding to the sampled source image; adjusting display pixel density distribution of a display of a light field display device at least according to the interest level distribution information; and displaying the light field image via the adjusted light field display device.

In other optional implementations, the processor 710 may further perform the steps mentioned in any one of the other embodiments by executing the program 732, which is not repeated herein.

Reference can be made to corresponding description in the corresponding steps, modules, sub-modules and units in the embodiments for specific implementation of the steps in the program 732, which is not repeated herein. Those skilled in the art can clearly understand that, reference can be made to the corresponding process description in the method embodiments for the devices described above and the specific working procedures of the modules, and will not be repeated herein in order to make the description convenient and concise.

One embodiment of the present application further provides a light field display device, comprising: a display, a sub-lens array and a light field display control apparatus. The light field display control apparatus may be any light field display control apparatus provided in the embodiments of the present application, which may perform image display control by executing any light field display control method provided in the embodiments of the present application during applications, which comprise, but are not limited to, image presentation and video playback. Device manifestations of the light field display control apparatus are not limited, for example, the light field display control apparatus may be a certain separate component, and the component cooperates with the light field display device comprising a display; or the light field display control apparatus may be integrated, as a certain functional module, into a display device comprising a display, and the light field display device may include, but is not limited to, TVs, computers, cameras, mobile phones, video recorders and the like which have light field display capability and comprise the display.

In addition to the light field display control apparatus, specific structures of components required by light field display comprised in the light field display device are not limited, the light field display device may be a light field display device of near-field or far-field display, and according to specific forms of the light field display device, may be a wearable near-field display device or a far-field display device capable of naked-eye viewing, which is not limited in the embodiment of the present application.

Figure 8:
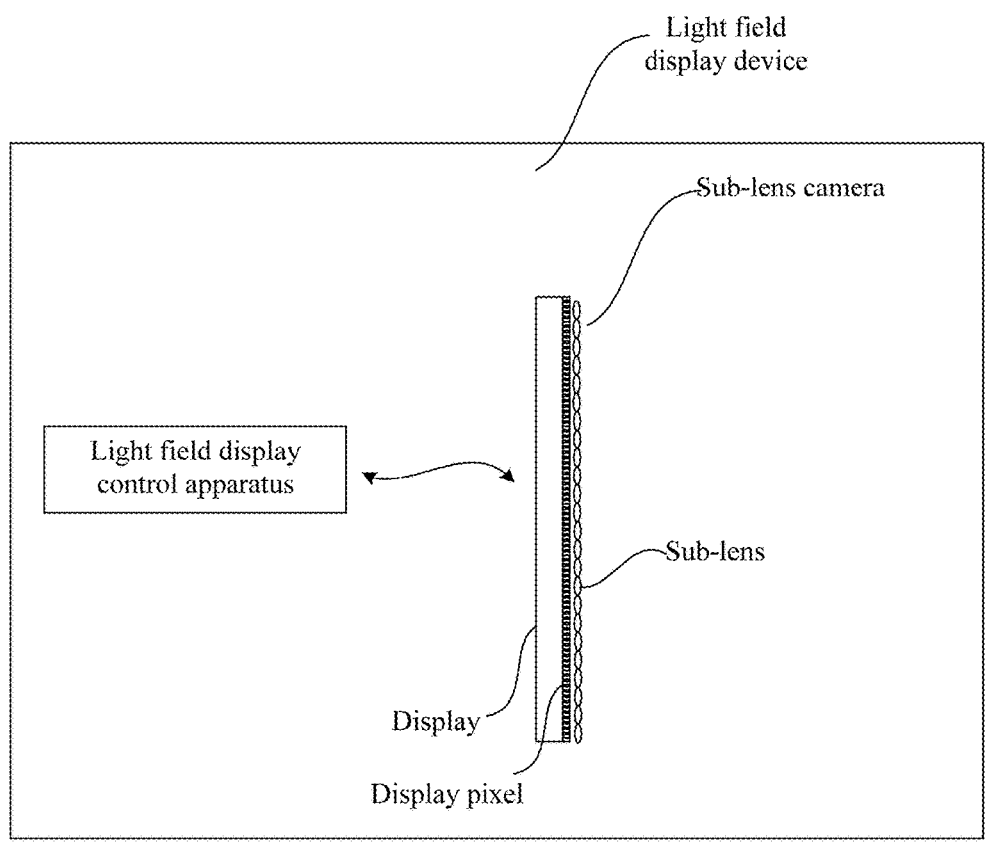
FIG. 8 is a schematic structural diagram of a light field display device according to one embodiment of the present application.

Optionally, as shown in FIG. 8, the display of the light field display device comprises multiple display regions, one of the display regions comprising multiple display pixels. The sub-lens array is disposed near the display; the sub-lens array comprises multiple sub-lenses, one of the sub-lenses corresponding to at least one of the display regions. The light field display control apparatus may be any light field display control apparatus provided in the embodiments of the present application, and the light field display control apparatus is in a communication connection with the display.

The display may be the flexible display as described above. Alternatively, the display may further comprise: multiple display pixels array-distributed; and a controllable deformed material portion respectively connected with the multiple display pixels; wherein the controllable deformed material portion can produce deformation under the action of an external field, and density distribution of the multiple display pixels is correspondingly adjusted through the deformation; the external field is controlled by the light field display control apparatus.

Reference can be made to the corresponding description in FIG. 1b to FIG. 1j for the structure of the display, the imaging control apparatus can directly control the external field to control deformation of the controllable deformed material portion, thereby adjusting pixel density distribution of the display; or the imaging control apparatus can indirectly control the external field by controlling the deformation control portion, to cause the controllable deformed material portion to produce corresponding deformation to correspondingly adjust pixel density distribution of the display; and so on. A manner in which the display pixels and the deformed material portion are physically connected can be determined according to actual needs, as long as the manner can meet that pixel density distribution of the display can be adjusted when the deformed material portion produces deformation, which is not limited in the embodiment of the present application, and reference can be made to the corresponding description above for a specific implementation thereof; reference can be made to FIG. 2, FIG. 4a, FIG. 4b and the corresponding description above for the light path structure of the light field display device, which is not repeated herein.

The technical solution provided in the embodiments of the present application can make full use of pixels of the display of the light field display device to present differential spatial resolution of different regions of a light field display image, thus making full use of existing pixels of the display to meet users' differential display demands for local definition of the image.

In the various embodiments of the present application, the serial numbers and/or sequence numbers of the foregoing embodiments are merely for the convenience of description, and do not imply the preference among the embodiments. Particular emphasis is put on the description about each embodiment, and reference can be made to relevant description of other embodiments for the content not detailed in a certain embodiment. Reference can be made to the description about the corresponding method embodiments for related description about the implementation principle or process of relevant apparatus, device or system embodiments, which is not repeated herein.

It can be appreciated by those of ordinary skill in the art that each exemplary unit and method step described with reference to the embodiments disclosed herein can be implemented by electronic hardware or a combination of computer software and electronic hardware. Whether these functions are executed in a hardware mode or a software mode depends on particular applications and design constraint conditions of the technical solution. The professional technicians can use different methods to implement the functions described with respect to each particular application, but such implementation should not be considered to go beyond the scope of the present application.

If the functions are implemented in the form of a software functional unit and is sold or used as an independent product, it can be stored in a computer-readable storage medium. Based on such understanding, the technical solution of the present application essentially or the part which contributes to the prior art or a part of the technical solution can be embodied in the form of a software product, and the computer software product is stored in a storage medium, and comprises several instructions for enabling a computer device (which can be a personal computer, a server, or a network device, and the like) to execute all or some steps of the method described in each embodiment of the present application. The foregoing storage medium comprises, a USB disk, a removable hard disk, a read-only memory (ROM), a random access memory (RAM), a magnetic disk, an optical disk or any other mediums that can store program codes.

In the embodiments of the apparatuses, methods and systems of the present application, it is apparent that the members (systems, sub-systems, modules, sub-modules, units, sub-units, and the like) or the steps can be decomposed, combined and/or recombined after decomposition. The decomposition and/or recombination should be regarded as equivalent solutions of the present application. Moreover, in the description about the embodiments of the present application, features described and/or illustrated with respect to one implementation may be used in one or more other implementations in the same or a similar manner, be combined with features in other implementations, or replace the features in other implementations.

It should be emphasized that, the term "comprise" used herein refers to existence of features, elements, steps or components, but does not exclude existence or addition of one or more other features, elements, steps or components.

Finally, it should be noted that, the above implementations are only intended to describe the present application rather than to limit the present application; various changes and variations can be made by those of ordinary skill in the art without departing from the spirit and scope of the present application, so all equivalent technical solutions also belong to the category of the present application, and the scope of patent protection of the present application should be defined by the claims.

What is claimed is:

1. A light field display control method, comprising:
    sampling a source image according to interest level distribution information of the source image;
    determining a light field image corresponding to the sampled source image;
    adjusting display pixel density distribution of a display of a light field display device at least according to the interest level distribution information; and
    displaying the light field image via the adjusted light field display device.

2. The light field display control method of claim 1, further comprising: acquiring the interest level distribution information of the source image.

3. The light field display control method of claim 2, wherein the acquiring the interest level distribution information comprises:
    acquiring interest level indication information of the source image; and
    determining the interest level distribution information according to the interest level indication information.

4. The light field display control method of claim 2, wherein the acquiring the interest level distribution information comprises:

performing image analysis on the source image; and
determining the interest level distribution information according to a result of the image analysis.

5. The light field display control method of claim 1, wherein the sampling a source image according to interest level distribution information comprises:
determining target sampling density distribution information according to the interest level distribution information, at least two target sampling densities in the target sampling density distribution information, which respectively correspond to different interest levels, are different; and
sampling the source image according to the target sampling density distribution information.

6. The light field display control method of claim 5, wherein an average target sampling density corresponding to interest levels higher than a first threshold is higher than an average target sampling density corresponding to interest levels lower than a second threshold, the first threshold being greater than or equal to the second threshold.

7. The light field display control method of claim 1, wherein the determining a light field image corresponding to the sampled source image comprises:
pre-processing the sampled source image according to vision information of a user to obtain the light field image.

8. The light field display control method of claim 7, further comprising: acquiring vision information of the user.

9. The light field display control method of claim 1, wherein the adjusting display pixel density distribution of a display at least according to the interest level distribution information comprises:
determining target pixel density distribution information of the display according to the vision information of the user and the interest level distribution information, at least two target pixel densities in the target pixel density distribution information, which respectively correspond to different interest levels, are different; and
adjusting the display pixel density distribution of the display according to the target pixel density distribution information.

10. The light field display control method of claim 9, wherein the determining target pixel density distribution information according to the vision information and the interest level distribution information comprises:
pre-processing the interest level distribution information according to the vision information to obtain light field interest level distribution information; and
determining the target pixel density distribution information according to the light field interest level distribution information.

11. The light field display control method of claim 9, wherein an average target pixel density corresponding to light field interest levels higher than a first threshold is higher than an average target pixel density corresponding to light field interest levels lower than a second threshold, the first threshold being greater than or equal to the second threshold.

12. The light field display control method of claim 9, wherein the adjusting the display pixel density distribution of the display according to the target pixel density distribution information comprises:
determining deformation control information of a controllable deformed material portion according to the target pixel density distribution information; and
controlling the controllable deformed material portion to produce deformation according to the deformation control information, so as to correspondingly adjust the display pixel density distribution of the display through the deformation of the controllable deformed material portion.

13. The light field display control method of claim 12, wherein the controllable deformed material portion is prepared from at least one or more of the following controllable deformed materials: piezoelectric materials, electroactive polymers, photodeformation materials and magnetostriction materials.

14. The light field display control method of claim 1, further comprising: in the course of displaying the light field image via the adjusted light field display device, performing balancing control on display brightness of different display regions of the display.

15. A light field display control apparatus, comprising:
a source image sampling module, configured to sample a source image according to interest level distribution information of the source image;
a light field image determination module, configured to determine a light field image corresponding to the sampled source image;
a display pixel density distribution adjusting module, configured to adjust display pixel density distribution of a display of a light field display device at least according to the interest level distribution information; and
a display control module, configured to display the light field image via the adjusted light field display device.

16. The light field display control apparatus of claim 15, further comprising:
an interest level distribution information acquisition module, configured to acquire the interest level distribution information of the source image.

17. The light field display control apparatus of claim 16, wherein the interest level distribution information acquisition module comprises:
an interest level indication information acquisition sub-module, configured to acquire interest level indication information of the source image; and
an interest level distribution information acquisition sub-module, configured to determine the interest level distribution information according to the interest level indication information.

18. The light field display control apparatus of claim 16, wherein the interest level distribution information acquisition module comprises:
an image analysis sub-module, configured to perform image analysis on the source image; and
an image analysis result determination sub-module, configured to determine the interest level distribution information according to a result of the image analysis.

19. The light field display control apparatus of claim 15, wherein the source image sampling module comprises:
a target sampling density distribution information determination sub-module, configured to determine target sampling density distribution information according to the interest level distribution information, at least two target sampling densities in the target sampling density distribution information, which respectively correspond to different interest levels, are different; and
a sampling sub-module, configured to sample the source image according to the target sampling density distribution information.

20. The light field display control apparatus of claim 19, wherein an average target sampling density corresponding to interest levels higher than a first threshold is higher than an average target sampling density corresponding to interest levels lower than a second threshold, the first threshold being greater than or equal to the second threshold.

21. The light field display control apparatus of claim 15, wherein the light field image determination module comprises:
a light field image determination sub-module, configured to pre-process the sampled source image according to vision information of a user to obtain the light field image.

22. The light field display control apparatus of claim 21, wherein the display pixel density distribution adjusting sub-module comprises:
a deformation control information determination unit, configured to determine deformation control information of a controllable deformed material portion according to the target pixel density distribution information; and
a deformation control unit, configured to control the controllable deformed material portion to produce deformation according to the deformation control information, so as to correspondingly adjust the display pixel density distribution of the display through the deformation of the controllable deformed material portion.

23. The light field display control apparatus of claim 22, wherein the controllable deformed material portion is prepared from at least one or more of the following controllable deformed materials: piezoelectric materials, electroactive polymers, photodeformation materials and magnetostriction materials.

24. The light field display control apparatus of claim 15, wherein the display pixel density distribution adjusting module comprises:
a target pixel density distribution information determination sub-module, configured to determine target pixel density distribution information of the display according to the vision information of the user and the interest level distribution information in the target pixel density distribution information, at least two target pixel densities, which respectively correspond to different interest levels, are different; and
a display pixel density distribution adjusting sub-module, configured to adjust the display pixel density distribution of the display according to the target pixel density distribution information.

25. The light field display control apparatus of claim 24, wherein the target pixel density distribution information determination sub-module comprises:
a light field interest level distribution information determination unit, configured to pre-process the interest level distribution information according to the vision information to obtain light field interest level distribution information; and
a target pixel density distribution information determination unit, configured to determine the target pixel density distribution information according to the light field interest level distribution information.

26. The light field display control apparatus of claim 25, wherein an average target pixel density corresponding to light field interest levels higher than a first threshold is higher than an average target pixel density corresponding to light field interest levels lower than a second threshold, the first threshold being greater than or equal to the second threshold.

27. The light field display control apparatus of claim 15, further comprising:
a vision information acquisition module, configured to acquire vision information of the user.

28. The light field display control apparatus of claim 15, further comprising:
a brightness balancing control module, configured to, in the course of displaying the light field image via the adjusted light field display device, perform balancing control on display brightness of different display regions of the display.

29. A light field display device, comprising:
a display;
a sub-lens array; and
the light field display control apparatus of claim 15, the light field display control apparatus being in a communication connection with the display.

30. The light field display device according to claim 29, wherein
the display comprises multiple display regions, one of the display regions comprising multiple display pixels; and
the sub-lens array is disposed near the display and comprises multiple sub-lenses, one of the sub-lenses corresponding to at least one of the display regions.

31. The light field display device according to claim 29, wherein the display comprises:
multiple array-distributed display pixels; and
a controllable deformed material portion, respectively connected with the multiple display pixels; wherein the controllable deformed material portion can produce deformation under the action of an external field, and correspondingly adjusts density distribution of the multiple display pixels through the deformation; and the external field is controlled by the light field display control apparatus.

32. A non-transitory computer-readable storage medium comprising at least one set of executable instructions, which, in response to execution, cause a light field display control method, comprising:
sampling a source image according to interest level distribution information of the source image;
determining a light field image corresponding to the sampled source image;
adjusting display pixel density distribution of a display of a light field display device at least according to the interest level distribution information; and
displaying the light field image via the adjusted light field display device.

33. A light field display control apparatus, comprising a processor and a memory, the memory storing computer executable instructions that, when executed by the processor, cause the apparatus to perform operations, comprising:
sampling a source image according to interest level distribution information of the source image;
determining a light field image corresponding to the sampled source image;
adjusting display pixel density distribution of a display of a light field display device at least according to the interest level distribution information; and
displaying the light field image via the adjusted light field display device.

* * * * *